(12) United States Patent
Dey et al.

(10) Patent No.: US 10,865,333 B2
(45) Date of Patent: Dec. 15, 2020

(54) POLYURETHANE ADHESIVES FOR REVERSE OSMOSIS MODULES

(71) Applicant: ELANTAS PDG, INC., St. Louis, MO (US)

(72) Inventors: Tanmoy Dey, Olean, NY (US); Richard D. Jordan, Jr., Allegany, NY (US); Michael Causer, Roulette, PA (US)

(73) Assignee: ELANTAS PDG, INC., St. Louis, MO (US)

( * ) Notice: Subject to any disclaimer, the term of this patent is extended or adjusted under 35 U.S.C. 154(b) by 0 days.

(21) Appl. No.: 15/092,892

(22) Filed: Apr. 7, 2016

(65) Prior Publication Data

US 2016/0298009 A1 Oct. 13, 2016

Related U.S. Application Data

(60) Provisional application No. 62/145,504, filed on Apr. 9, 2015.

(51) Int. Cl.
  *C09J 175/08* (2006.01)
  *C08G 18/48* (2006.01)
  (Continued)

(52) U.S. Cl.
  CPC .......... *C09J 175/08* (2013.01); *B01D 63/103* (2013.01); *B01D 65/003* (2013.01); *C08G 18/10* (2013.01);
  (Continued)

(58) Field of Classification Search
  None
  See application file for complete search history.

(56) References Cited

U.S. PATENT DOCUMENTS 3,733,426 A 5/1973 Kaufman et al.
3,747,037 A 7/1973 Earing
(Continued)

FOREIGN PATENT DOCUMENTS

CN 101824298 A 9/2010
CN 101885828 A 11/2010
(Continued)

OTHER PUBLICATIONS

International Search Report for International Application No. PCT/US2014/067837; International Filing Date Nov. 29, 2014; dated Feb. 23, 2015; 4 pages.
(Continued)

*Primary Examiner* — Krishnan S Menon
(74) *Attorney, Agent, or Firm* — Curatolo Sidoti Co., LPA; Salvatore A. Sidoti

(57) ABSTRACT

An adhesive composition is made from a first part containing an isocyanate group-containing prepolymer that is a reaction product of a first isocyanate and at least one polyol; and a second isocyanate that is essentially unreacted with the first isocyanate, the at least one polyol, and the isocyanate group containing prepolymer; and a second part containing at least two polyols; wherein the adhesive composition is essentially free of diluent oils and solvents. A polyurethane adhesive is made by mixing the first part and the second part in a 1:1 to 1.2:1 weight ratio of the first part to the second part to form a mixture, and curing the mixture. The polyurethane adhesive can be used in articles, including semipermeable membranes and reverse osmosis modules. When a solvent is filtered through the semipermeable membranes by reverse osmosis, the polyurethane adhesive prevents or reduces osmotic blistering.

26 Claims, 6 Drawing Sheets

(51) Int. Cl.

| | |
|---|---|
| *C08G 18/10* | (2006.01) |
| *C08G 18/32* | (2006.01) |
| *C08G 18/24* | (2006.01) |
| *C08G 18/62* | (2006.01) |
| *C08G 18/66* | (2006.01) |
| *C08G 18/73* | (2006.01) |
| *C08G 18/79* | (2006.01) |
| *C08G 18/76* | (2006.01) |
| *C09J 175/04* | (2006.01) |
| *C08G 18/80* | (2006.01) |
| *C08G 18/36* | (2006.01) |
| *B01D 63/10* | (2006.01) |
| *B01D 65/00* | (2006.01) |
| *C08J 5/00* | (2006.01) |
| *B01D 61/02* | (2006.01) |
| *C09J 5/00* | (2006.01) |

(52) U.S. Cl.
CPC ....... *C08G 18/246* (2013.01); *C08G 18/3206* (2013.01); *C08G 18/36* (2013.01); *C08G 18/48* (2013.01); *C08G 18/4825* (2013.01); *C08G 18/4829* (2013.01); *C08G 18/4837* (2013.01); *C08G 18/6208* (2013.01); *C08G 18/6677* (2013.01); *C08G 18/73* (2013.01); *C08G 18/7642* (2013.01); *C08G 18/7671* (2013.01); *C08G 18/797* (2013.01); *C08G 18/8019* (2013.01); *C09J 5/00* (2013.01); *C09J 175/04* (2013.01); *B01D 61/025* (2013.01); *B01D 2313/04* (2013.01); *C09J 2475/00* (2013.01)

(56) References Cited

U.S. PATENT DOCUMENTS

| | | |
|---|---|---|
| 3,962,094 A | 6/1976 | Davis et al. |
| 4,008,197 A | 2/1977 | Brauer et al. |
| 4,168,258 A | 9/1979 | Brauer et al. |
| 4,170,559 A | 10/1979 | Kroplinski et al. |
| 4,224,164 A | 9/1980 | Brauer et al. |
| 4,256,617 A | 3/1981 | Kroplinski et al. |
| 4,267,044 A | 5/1981 | Kroplinski et al. |
| 4,284,506 A | 8/1981 | Tetenbaum et al. |
| 4,300,184 A | 11/1981 | Colla |
| 4,332,927 A * | 6/1982 | Simone ................ C08G 18/10 528/58 |
| 4,373,081 A | 2/1983 | Nachtkamp et al. |
| 4,375,521 A | 3/1983 | Arnold |
| 4,395,530 A | 7/1983 | Hammond |
| 4,444,976 A | 4/1984 | Rabito |
| 4,454,176 A | 6/1984 | Buckfelder et al. |
| 4,518,631 A | 5/1985 | Antonen |
| 4,603,188 A | 7/1986 | Kusakawa et al. |
| 4,842,736 A | 6/1989 | Bray et al. |
| 4,865,735 A | 9/1989 | Chu et al. |
| 4,876,303 A | 10/1989 | Chapin et al. |
| 4,879,032 A | 11/1989 | Zemlin |
| 4,886,600 A | 12/1989 | Chu et al. |
| 4,923,756 A | 5/1990 | Chung et al. |
| 4,948,508 A | 8/1990 | Nakagawa et al. |
| 5,266,145 A | 11/1993 | Duck et al. |
| 5,288,797 A | 2/1994 | Khalil et al. |
| 5,306,798 A | 4/1994 | Horn et al. |
| 5,360,543 A | 11/1994 | Usifer et al. |
| 5,556,934 A | 9/1996 | Hagquist et al. |
| 5,863,597 A | 1/1999 | Lynch |
| 5,871,822 A | 2/1999 | Lepsche et al. |
| 6,130,268 A | 10/2000 | Murray |
| 7,303,675 B2 | 12/2007 | De La Cruz |
| 7,781,513 B2 | 8/2010 | Lucas et al. |
| 8,360,390 B2 | 1/2013 | Fornage |
| 8,822,844 B1 | 9/2014 | Dimke et al. |
| 2004/0012936 A1 | 1/2004 | Gravelin |
| 2004/0072953 A1 | 4/2004 | Hung et al. |
| 2004/0081830 A1* | 4/2004 | Croley ............... C08G 18/0885 428/422.8 |
| 2004/0138402 A1 | 7/2004 | Thiele et al. |
| 2004/0198943 A1* | 10/2004 | Slack ..................... C08G 18/10 528/60 |
| 2005/0073552 A1 | 4/2005 | Smoot et al. |
| 2006/0076047 A1 | 4/2006 | Green et al. |
| 2008/0149257 A1 | 6/2008 | Tribelhorn et al. |
| 2009/0124751 A1 | 5/2009 | Lucas et al. |
| 2009/0242123 A1 | 10/2009 | Zhang et al. |
| 2010/0170843 A1* | 7/2010 | Yamato ................ B01D 63/023 210/323.1 |
| 2012/0156506 A1* | 6/2012 | Shah ..................... C08G 18/12 428/423.1 |
| 2013/0059082 A1 | 3/2013 | Wang et al. |
| 2014/0355225 A1 | 12/2014 | Jordan, Jr. et al. |
| 2015/0077947 A1 | 3/2015 | Jordan, Jr. et al. |
| 2015/0259583 A1 | 9/2015 | Kahle et al. |
| 2016/0145476 A1 | 5/2016 | Jordan, Jr. et al. |

FOREIGN PATENT DOCUMENTS

| | | |
|---|---|---|
| CN | 102850989 A | 1/2013 |
| CN | 102911636 A | 2/2013 |
| EP | 0037403 A1 | 10/1981 |
| JP | H03217473 A | 9/1991 |
| JP | H0657236 A | 3/1994 |
| JP | 2006096912 A | 4/2006 |
| WO | 2004035647 A1 | 4/2004 |
| WO | 2009020774 A1 | 2/2009 |
| WO | 2009039145 A1 | 3/2009 |
| WO | 2009123905 A1 | 10/2009 |
| WO | 2012010559 A1 | 1/2012 |

OTHER PUBLICATIONS

Written Opinion of the International Search Report for International Application No. PCT/US2014/067837; International Filing Date Nov. 29, 2014; dated Feb. 23, 2015; 6 pages.

Wypych; "Plasticizers Use and Selection for Specific Polymers"; ChemTec Laboratories, Inc., Toronto, Canada; Handbook of Plasticizers; Chapter 11; 107 pages; No Date.

International Search Report and Written Opinion for International Application No. PCT/US2015/019882, International Filing Date Mar. 11, 2015, dated Jul. 3, 2015, 11 pages.

International Search Report for International Application No. PCT/US2014/040421, International Filing Date May 31, 2014, dated Aug. 25, 2014, 3 pages.

International Search Report for International Application No. PCT/US2015/062342, International Filing Date Nov. 24, 2015, dated Apr. 7, 2016, 5 pages.

International Search Report for International Application No. PCT/US2016/026347, International Filing Date Apr. 7, 2016, dated Jun. 1, 2016, 6 pages.

Written Opinion for International Application No. PCT/US2014/040421, International Filing Date May 31, 2014, dated Aug. 25, 2014, 6 pages.

Written Opinion for International Application No. PCT/US2015/062342, International Filing Date Nov. 24, 2015, dated Apr. 7, 2016, 5 pages.

Written Opinion for International Application No. PCT/US2016/026347, International Filing Date Apr. 7, 2016, dated Jun. 1, 2016, 5 pages.

* cited by examiner

POLYURETHANE ADHESIVES FOR REVERSE OSMOSIS MODULES

RELATED APPLICATIONS

This application claims priority to U.S. Provisional Application No. 62/145,504, filed Apr. 9, 2015. This application is also technically related to co-pending U.S. application Ser. No. 14/644,453 filed on Mar. 11, 2015. Each of these applications is incorporated herein by reference in its entirety.

TECHNICAL FIELD

The present invention generally relates to polyurethane adhesives, for example polyurethane adhesives used in the fabrication of spiral wound flat sheet membranes, which can be used for reverse osmosis, microfiltration, ultrafiltration, and nanofiltration. The polyurethane adhesives can be used, for example, in reverse osmosis modules.

BACKGROUND

Reverse osmosis is the process of forcing a solvent from a region of high solute concentration through a polymeric semipermeable membrane to a region of low solute concentration. The process is done by applying a pressure in excess of the osmotic pressure. Reverse osmosis has numerous applications, including, but not limited to, the separation of pure water from seawater and brackish water where seawater or brackish water is pressurized against one surface of the semipermeable membrane, causing transport of salt-depleted water across the membrane and emergence of potable drinking water from the low-pressure side. Other applications of reverse osmosis include concentrating food liquids, e.g., orange juice, production of maple syrup, and production of hydrogen.

Reverse osmosis membranes include a thin dense semipermeable layer where separation of solute from solvent occurs and a porous support layer that can include a nonwoven fabric. The semipermeable membrane allows only solvent (such as water) to pass through the dense layer, while preventing the passage of solutes (such as salt ions). Semipermeable membranes can be fabricated into spiral wound flat sheet configurations for use in reverse osmosis filtration cartridges. As discussed in U.S. Pat. No. 4,842,736, spiral wound filtration cartridges include adhesives to seal the interstices or voids in the membrane, which prevents leakage of feed fluid to the permeate collection tube. In a particular example, as discussed in U.S. Pat. No. 7,303,675, the adhesive can be applied to an upstream surface of a membrane in locations where a downstream surface has been treated so that flow therethrough is prevented. The adhesive can be applied to other locations on the membrane surface as required by the filtration cartridge structure and/or end-use application, such as, for example, in folds of the membrane, along longitudinal edges, or on downstream surfaces.

Since the filtration cartridge is subjected to high water pressure, the fully-cured adhesive must be strong and durable. If the hardness of the fully-cured adhesive is too low, then the pressure of the water can cause failure of the adhesive bond, and ultimately the failure of the filtration cartridge. However, if the hardness of the fully-cured adhesive is too high, the adhesive can become brittle, also resulting in failure. The hardness of the adhesive can be measured on the Shore hardness scale, and the methods of taking such measurements are known in the art. The tensile strength of a fully-cured adhesive is also important for adhesive durability. The adhesive must also be able to easily penetrate the porous support layer to form a strong adhesive bond to the semipermeable layer. If a strong adhesive bond is not formed between the porous support layer and the semipermeable layer, the semipermeable layer can partially delaminate during operation, which results in the formation of blisters. This phenomenon is known as osmotic blistering.

As noted in U.S. Pat. No. 7,303,675, osmotic blistering is exacerbated by repetitive use of alkaline cleaning fluids, for example aqueous sodium hydroxide solutions, which are frequently used in the industry. Under these conditions, commercial adhesives can crack or blister, which results in side seal leakage and end seal leakage (often referred to as "veining" or "lightning bolt" failure) of the feed fluid to the permeate collection tube. Osmotic blistering can also promote bacterial growth and can result in dimensional changes to the membrane, making it difficult to remove and replace.

Accordingly, there is room for improvement in the adhesive compositions presently available for use in reverse osmosis modules. The adhesive composition should readily penetrate porous support layers and form a strong and durable adhesive bond to the semipermeable layer, so as to prevent osmotic blistering. The cured adhesive should be resistant to chemicals such as alkaline cleaning fluids. Moreover, these improvements should be made without adversely affecting other properties such as rheology, viscosity, and flow control of the adhesive composition.

SUMMARY

An adhesive composition comprises a first part comprising: an isocyanate group-containing prepolymer comprising a reaction product of a first isocyanate and at least one polyol; and a second isocyanate that is essentially unreacted with the first isocyanate, the at least one polyol, and the isocyanate group containing prepolymer; and a second part comprising at least two polyols; wherein the adhesive composition is essentially free of diluent oils and solvents.

A polyurethane adhesive is made by mixing the first part and the second part of the adhesive composition in a 1:1 to 1.2:1 weight ratio of the first part to the second part to form a mixture, and curing the mixture. The polyurethane adhesive can be used in articles, including semipermeable membranes and reverse osmosis modules.

A method for preventing or reducing osmotic blistering of a semipermeable membrane otherwise subject thereto, comprises forming the adhesive composition; mixing the first part and second part of the adhesive composition to form a mixture; applying the mixture to a semipermeable membrane in an amount sufficient to secure the semipermeable membrane to a porous support; curing the mixture to form a polyurethane adhesive; and filtering a solvent through the semipermeable membrane by reverse osmosis; wherein the polyurethane adhesive prevents or reduces osmotic blistering of the semipermeable membrane.

A process for forming an isocyanate-containing prepolymer having a second reactive isocyanate species comprises reacting a first isocyanate and at least one polyol to form an isocyanate-containing prepolymer; and mixing the isocyanate-containing prepolymer with a second isocyanate; wherein the second isocyanate is essentially unreacted with the first isocyanate, the at least one polyol, and the isocyanate group-containing prepolymer.

These and other objects, features and advantages will become apparent from the following detailed description of the various aspects and embodiments taken in conjunction with the accompanying figures and examples.

DETAILED DESCRIPTION

Figure 1:
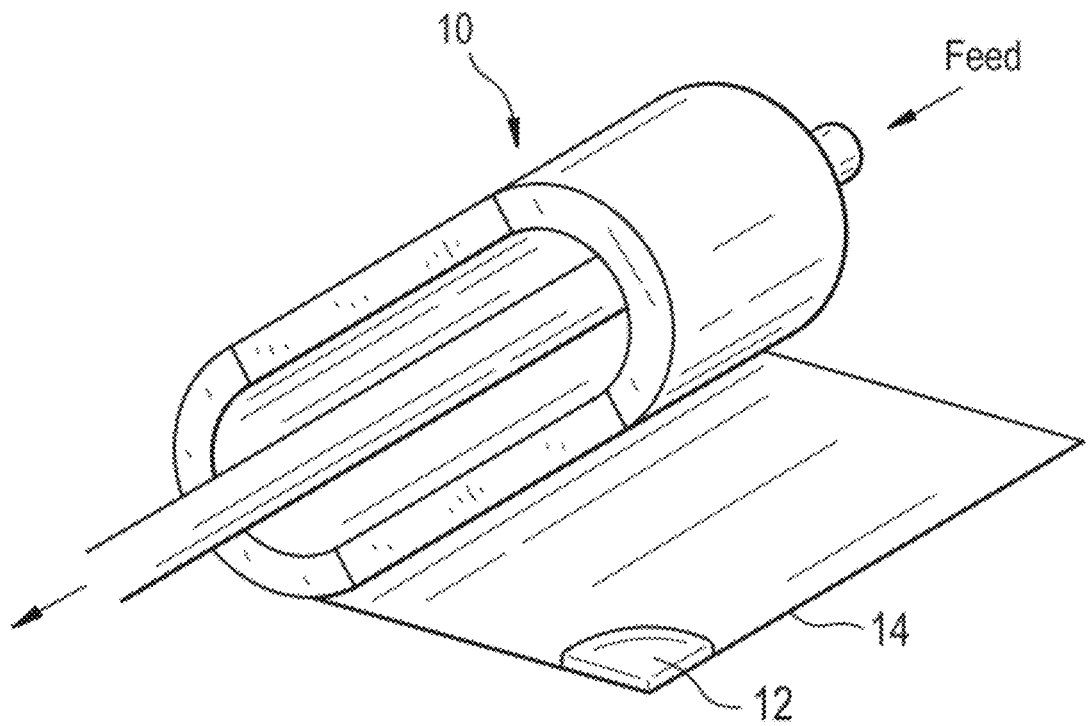
FIG. 1 is a perspective drawing of a reverse osmosis module 10 having a semipermeable membrane 14 with the adhesive composition 12 applied to at least a portion thereof.

The adhesive compositions disclosed herein readily penetrate porous support layers of reverse osmosis membranes to form strong and durable bonds to the semipermeable layer. Moreover, the cured adhesive is resistant to alkaline cleaning fluids, which are commonly used. Advantageously, osmotic blistering in reverse osmosis membranes utilizing the present adhesive composition is reduced or eliminated. The adhesive compositions also meet or exceed industry specifications for rheology, viscosity, and flow control.

The adhesive composition comprises: a first part comprising: an isocyanate group-containing prepolymer comprising a reaction product of a first isocyanate and at least one polyol; and a second isocyanate that is essentially unreacted with the first isocyanate, the at least one polyol, and the isocyanate group containing prepolymer; and a second part comprising at least two polyols; wherein the adhesive composition is essentially free of diluent oils and solvents.

The adhesive composition comprises a first part comprising an isocyanate-group containing prepolymer comprising a reaction product of a first isocyanate and at least one polyol. The first part is sometimes referred to as part (A) in the art. The first part also comprises a second isocyanate, which can be the same or different than the first isocyanate. The first and second isocyanate can have an isocyanate content of 15 to 40 wt %, as measured according to ASTM D2572, and can have an isocyanate functionality of 2 to 6, specifically 2 to 4, isocyanate groups per molecule. In some embodiments, the first isocyanate and second isocyanates are independently 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate and cyclohexane-1,4-diisocyanate, 1-isocyanato-2-isocyanatomethyl cyclopentane, 1-isocyanato-3-isocyanatomethyl-3,5,5-trimethyl-cyclohexane, 4,4'-dicyclohexylmethane diisocyanate, 2,4'-dicyclohexylmethane diisocyanate, 1,3-bis(isocyanatomethyl)-cyclohexane, 1,4-bis-(isocyanatomethyl)-cyclohexane, bis(4-isocyanato-3-methyl-cyclohexyl)methane, 1-isocyanato-1-methyl-4(3)-isocyanatomethyl cyclohexane, alpha, alpha, alpha', alpha'-tetramethyl-1,3-xylylene diisocyanate, alpha, alpha,alpha',alpha'-tetramethyl-1,4-xylylene diisocyanate, 2,4-hexahydrotoluene diisocyanate, 2,6-hexahydrotoluene diisocyanate, 1,3-phenylene diisocyanate, 1,4-phenylene diisocyanate, 2,4-toluene diisocyanate, 2,6-toluene diisocyanate, 2,4-diphenylmethane diisocyanate, 1,5-diisocyanato naphthalene, 4,4'-diphenylmethane diisocyanate, a modification of at least one of the foregoing isocyanates, a prepolymer derived from reaction of at least one of the foregoing isocyanates with a diol or a diamine, and combinations comprising at least one of the foregoing isocyanates. 4,4'-Diphenylmethane diisocyanate can comprise isomers thereof, for example, 2,4'-diphenylmethane diisocyanate and 2,2'-diphenylmethane diisocyanate.

In some embodiments, the first and second isocyanate are independently monomeric diphenylmethane diisocyanate, a modified diphenylmethane diisocyanate having an average of greater than 2 and less than or equal to 4 isocyanate groups per molecule, or combinations comprising at least one of the foregoing isocyanates. In some embodiments, the first and second isocyanate are independently modified diphenylmethane isocyanate selected from a carbodiimide-modified diphenylmethane diisocyanate, a prepolymer derived from reaction of diphenylmethane diisocyanate with a diol or diamine, or a combination comprising at least one of the foregoing isocyanates. Carbodiimide-modified diphenylmethane diisocyanate is also known as a uretonimine-modified diphenylmethane diisocyanate, as uretonimine groups can be in equilibrium with carbodiimide groups and isocyanate groups.

The first polyisocyanate can be, for example, a monomeric diphenylmethane diisocyanate (MDI) containing a high percentage of 2,4'-diphenylmethane diisocyanate, and having an isocyanate functionality of about 2, and an isocyanate content of 33.4 wt %, available as MONDUR™ MLQ from Covestro; a uretonimine-modified diphenylmethane diisocyanate (MDI), having an isocyanate functionality of about 2.2, 29.5 wt % isocyanate content, and an equivalent weight of 143 g/mole, available as MONDUR™ DC from Covestro; or a prepolymer composition derived from 4,4'-diphenylmethane diisocyanate containing 50-60 wt % 4,4'-diphenylmethane diisocyanate, 40-50 wt % prepolymer (dipropylene glycol, polymer with 4,4'-diphenylmethane diisocyanate), and 1-10 wt % diphenylmethane diisocyanate mixed isomers; CAS Reg. No. 52747-01-0; available as MONDUR™ PF from Covestro; and having an NCO content of 22.6-23.1 wt %.

The isocyanate group-containing prepolymer comprises a reaction product of a first isocyanate and at least one polyol. In some embodiments, the at least one polyol used in the prepolymer comprises castor oil, a castor oil derivative, an ester of ricinoleic acid, a polyol derived from natural oils, a polyol derived from fats, a polyether polyol, a polylactone, a polyester polyol, a polybutadiene polyol, a polyisobutylene diol, a polyol having amine functionality, or a combination comprising at least one of the foregoing polyols. The at least one polyol can comprise a first polyol and a second polyol. In some embodiments, the at least one polyol used in the prepolymer comprises castor oil, a castor oil derivative, an ester of ricinoleic acid, a polyether polyol, a polybutadiene polyol, a polyisobutylene diol, or a combination comprising at least one of the foregoing polyols. The at least one polyol can comprise a first polyol and a second polyol.

The at least one polyol of the prepolymer can comprise castor oil or a castor oil derivatives. Castor oil is a vegetable oil obtained by pressing the seeds of the castor oil plant. Chemically, it is a triglyceride in which on average 85-95 wt % of the fatty acid chains are derived from ricinoleic acid. Castor oil derivatives include any polyol derived from castor oil, including hydrolysis products, ethoxylated castor oil, transesterified castor oil, esterified castor oil, and amide derivatives. For example, the castor oil derivative can be castor oil transesterified with pentaerythritol. The at least one polyol can also be an ester of ricinoleic acid.

The at least one polyol used in the prepolymer can comprise a polyether polyol. The polyether polyol can be the reaction product of a polyol initiator with ethylene oxide, propylene glycol, or a combination thereof. The polyol initiator can be glycerin, trimethylolpropane, 1,2,6-hexanetriol, erythritol, pentaerythritol, mannitol, sorbitol, sucrose, or combinations thereof. The polyether polyol can be, for example, a reaction product of glycerol with ethylene oxide and propylene oxide having a number average molecular weight of 265 g/mol, a hydroxyl no. of 648 mg KOH/g, and a maximum acid no. of 0.05 mg KOH/g, available from Monument Chemical as POLY-G™ 76-635; a reaction product of ethylene oxide and propylene oxide with glycerol having number average molecular weight of 2,000 g/mol, a hydroxyl no. of 56 mg KOH/g, and a maximum acid no. of 0.05 mg KOH/g, available from BASF as PLURACOL™ PEP-450. The polyether polyol can be a polyether diol. The polyether diol can be polyethylene glycol, polypropylene glycol, poly(tetramethylene glycol), or combinations thereof. The polyether polyol can be, for example, a polypropylene glycol having a number average molecular weight of 2,000 g/mol, a hydroxyl no. of 56 mg KOH/g, and a maximum acid no. of 0.05 mg KOH/g, available from Monument Chemical as POLY-G™ 20-56.

The at least one polyol can comprise a polybutadiene polyol, i.e. a low molecular weight, hydroxyl terminated homopolymer of butadiene. The hydroxyl groups can be primary or secondary. For example, the polybutadiene polyol can be a low molecular weight liquid hydroxyl-terminated polymer of butadiene available as POLY BD™ R-45HTLO or POLY BD™ R-20LM, from Cray Valley USA, Exton, Pa., USA, or available as HYPRO™ 2800X95 HTB from CVC Thermoset Specialties, Moorestown, N.J., USA.

The at least one polyol can comprise a polyol derived from natural oils or fats. The at least one polyol derived from natural oils or fats can be made by epoxidation, hydroxylation, ozonolysis, esterification, hydroformylation followed by reduction, or alkoxylation, of the natural oils or fats.

The at least one polyol can comprise a castor oil derivative. The castor oil derivative can be an ester of ricinoleic acid. Thus in some embodiments, the at least one polyol can comprise an ester of ricinoleic acid. The ester of ricinoleic acid can be castor oil, which is as mixture of mono-, di- and triglycerides having an average hydroxyl functionality of about 2.7. The ester of ricinoleic acid can also be a glycol, polyethylene glycol, polypropylene glycol, or other polyhydric alcohol mono-, di-, or polyester of ricinoleic acid. The ester of ricinoleic acid can be made by esterification of ricinoleic acid with alcohols such as ethylene glycol, glycerol, propylene glycol, hexylene glycol, diethylene glycol, dipropylene glycol, hexamethylene glycol, polyethylene glycol, polypropylene glycol, sucrose, sorbitol, or combinations thereof. Examples of esters of ricinoleic acid include ethylene glycol mono- and diricinoleates, propyl mono- and diricinoleates, pentaerythritol di-, tri-, tetra-, and pentaricinoleates, glycerol ricinoleate, 1,4-cyclohexanedimethanol mono- and diricinoleate, butanediol diricinoleate, neopentyl glycol mono- and diricinoleate, and mono- or diricinoleates of N,N-bis(2-hydroxypropyl)aniline or N,N,N',N'-tetrakis(2-hydroxypropyl)ethylene diamine, and combinations thereof. The castor oil derivative can also be ethoxylated castor oil, propoxylated castor oil, or ethoxylated/propoxylated castor oil, for examples LUPRANOL™ BALANCE 50, available from Elastogram GmbH of the BASF Group. In some embodiments, the castor oil derivative comprises a transesterification product of castor oil with pentaerythritol.

In some embodiments, the isocyanate (NCO) content of the isocyanate-containing prepolymer is 5 to 25 weight percent, based on the total weight of the isocyanate-containing prepolymer, as measured in accordance with ASTM D2572. Within this range, the isocyanate content can be 10 to 20 weight percent, specifically 12 to 19 weight percent.

The first part of the adhesive composition further comprises a second isocyanate that is essentially unreacted with the first isocyanate, the at least one polyol, and the isocyanate group containing prepolymer. The second isocyanate can be the same or different than the first isocyanate. In some embodiments, the second isocyanate is the same as the first isocyanate. In some embodiments, the second isocyanate is different than the first isocyanates; and the first and second isocyanates can be independently selected from the above isocyanates. "Essentially unreacted" means that less than 15, 10, 5, 4, 3, 2, or 1 weight percent of the second isocyanate is reacted with itself, the first isocyanate, the at least one polyol, and the isocyanate-group containing prepolymer. The inclusion of a second isocyanate in the first part advantageously results in improved blistering resistance in reverse osmosis membranes using the present adhesive composition. Without being bound by theory, the adhesive composition readily penetrates the porous support layers of reverse osmosis membranes to form strong and durable bonds to semipermeable layers. The second isocyanate serves as a reactive diluent for the first part, and for the isocyanate-containing prepolymer and for the adhesive composition.

In some embodiments, the isocyanate content of the first part of the adhesive composition, which comprises the isocyanate-containing prepolymer and the second isocyanate, is 10 to 35 weight percent, specifically 10 to 30 weight percent, and more specifically 12 to 25 weight percent, based on the total weight of the first part, as measured in accordance with ASTM D2572. The first part of the adhesive composition can comprise 80 to 96 weight percent, specifically 88 to 92 weight percent, of the isocyanate-containing prepolymer, based on the total weight of the first part.

The adhesive composition comprises a second part comprising at least two polyols. In some embodiments, the at least two polyols of the second part comprise castor oil, a castor oil derivative, an ester of ricinoleic acid, a polyol derived from natural oils, a polyol derived from fats, a polyether polyol, a polylactone, a polyester polyol, a polybutadiene polyol, a polyisobutylene diol, a polyol having amine functionality, or a combination comprising at least one of the foregoing polyols. In some embodiments, the at least two polyols of the second part comprise a polyether polyol, castor oil, a castor oil derivative, an ester of ricinoleic acid, a polyol having amine functionality, or combinations comprising at least two of the foregoing polyols. Suitable polyether polyols, castor oil, and castor oil derivatives are the same as described above for the at least one polyol of the isocyanate-containing prepolymer. The at least two polyols can comprise a polyol having amine functionality. Advantageously, the polyol having amine functionality can accelerate the reaction between the first and second parts of the adhesive composition after mixing. An example of a polyol having amine functionality is tetra-(2-hydroxypropyl)ethylenediamine, having a molecular weight of 292 g/mol, and a viscosity of 900 cP at 60° C., available from BASF as QUADROL™ Polyol.

In some embodiments, the first part, the second part, or the first part and the second part of the adhesive composition can further comprise a monomeric polyol. Advantageously, the use of a monomeric polyol in the adhesive composition can increase the hardness of the polyurethane adhesive. For example, the monomeric polyol can increase hardness when the at least two polyols of the second part comprises a polybutadiene diol. The monomeric polyol can have a molecular weight of less than or equal to about 600 g/mole, specifically about 80 to about 300 g/mole, and more specifically about 80 to about 200 g/mole. In some embodiments, the monomeric polyol has a molecular weight of about 300 to about 600 g/mole. In some embodiments, the monomeric diol is a diol having 3 to 20 carbon atoms, specifically 4 to 12 carbon atoms, and more specifically 5 to 10 carbon atoms. Examples of monomeric diols include 1,2-ethanediol (ethylene glycol), 1,2-propanediol (propylene glycol), 1,3-butanediol, 1,4-butanediol, 2,2,4-trimethyl-1,3-pentanediol, 1,2-hexanediol, 2-ethyl-1,3-hexanediol (ethylhexyl diol), 1,2-octanediol, 1,2-decanediol, 1,2-octadecanediol, and combinations thereof. The monomeric polyol can also be a triol, such as glycerol, trimethylolpropane, or 1,2,6-hexanetriol; or a tetrol such as pentaerythritol. In some embodiments, the monomeric polyol is 2-ethyl-1,3-hexanediol. The adhesive composition can comprise greater than or equal to 4 weight percent monomeric polyol, based on the total weight of the adhesive composition. Within this range, the adhesive composition can comprise 4 to 30 weight percent of the monomeric polyol. In some embodiments, monomeric polyols are absent from the adhesive composition.

The adhesive composition is essentially free of diluent oils and solvents. The term "essentially free" as used herein means the adhesive composition contains unavoidable levels of diluent oils and solvents, but no diluent oils and solvents are intentionally added. Diluent oils and solvents are not reactive with the first and second isocyanates, the isocyanate group-containing prepolymer, the at least one polyol of the first part, and the at least two polyols of the second part. Diluent oils and solvents include hydrocarbons such as branched, linear, cyclic paraffinic and naphthenic hydrocarbons; aromatic hydrocarbons such as benzene, toluene and xylene; petroleum spirits; kerosene; mineral oils; vegetable oils such as corn oil, canola oil, and olive oil; low boiling ethers such as dialkyl or cyclic ethers. In some embodiments, the adhesive composition is essentially free of volatile solvents with an initial boiling point of less than or equal to 300° C., specifically less than or equal to 200° C., and more specifically 30 to 200° C.

Advantageously, the present inventors have found that the properties of the adhesive composition and the polyurethane adhesive made by curing the adhesive composition can be tailored by selection of the at least one polyol for the first part of the adhesive composition. In some embodiments, the at least one polyol of the first part consists of castor oil or a castor oil derivative. In some embodiments, the at least one polyol of the first part comprises castor oil or a castor oil derivative, and a polyether diol. In some embodiments, the at least one polyol of the first part consists of a tetrol. In some embodiments, the at least one polyol of the first part consists of polybutadiene polyol.

Advantageously, the present inventors have also found that the properties of the adhesive composition and the polyurethane adhesive made by curing the adhesive composition can be tailored by selection of the at least two polyols for the second part of the adhesive composition. In some embodiments, the at least two polyols of the second part comprise castor oil, a castor oil derivative, an ester of ricinoleic acid, a polyol derived from natural oils, a polyether polyol, or a combination comprising at least two of the foregoing polyols. The adhesive composition of claim 13, wherein the at least two polyols of the second part comprise a transesterification product of castor oil with pentaerythritol, and a polyether triol. In some embodiments, the at least two polyols of the second part comprise castor oil, a transesterification product of castor oil with pentaerythritol, a polyether tetrol, or a combination comprising at least two of the foregoing polyols. In some embodiments, the at least two polyols of the second part comprise castor oil, a polyether tetrol, a polyol having amine functionality, or a combination comprising at least two of the foregoing polyols.

It is generally desirable to include polybutadiene diols in the adhesive composition, because they can improve the chemical resistance of resultant polyurethane adhesives. However, polybutadiene diols can be more expensive than other polyols. Thus, in some embodiments, polybutadiene diols and polyisobutylene diols are absent from the second part of the adhesive composition.

In some embodiments, the second part of the adhesive composition further comprises a primary amine-terminated polyether, for example a polyether diamine or a polyether triamine. The polyether diamine is a primary amine-terminated poly(propylene oxide) or a primary amine-terminated poly(ethylene oxide)-co-poly(propylene oxide). The polyether triamine is reaction product of a triol initiator, for example glycerol or trimethylolpropane, with ethylene oxide, propylene oxide, or a combination comprising at least one of the foregoing, in which the terminal hydroxyl groups are converted to primary amino groups. In some embodiments, the polyether diamine is a primary amine-terminated poly(propylene oxide) having a molecular weight of about 200 to about 4,000 g/mole, and containing about 2.5 to about 68 propylene oxide repeat units. A specific example of a primary amine-terminated polyether is JEFFAMINE D-230, which is a primary amine-terminated poly(propylene oxide) having a molecular weight of 230 g/mole, and an average amine hydrogen equivalent weight of 60 g/equivalent, which is available from Huntsman Corp., Salt Lake City, Utah, USA. Advantageously, addition of the primary amine-terminated polyether can serve as an anti-sagging agent by accelerating cure.

The second isocyanate can comprise an aliphatic isocyanate. In some embodiments, the aliphatic isocyanate is 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate and cyclohexane-1,4-diisocyanate, 1-isocyanato-2-isocyanatomethyl cyclopentane, 1-isocyanato-3-isocyanatomethyl-3,5,5-trimethyl-cyclohexane, 4,4'-dicyclohexylmethane diisocyanate, 2,4'-dicyclohexylmethane diisocyanate, 1,3-bis(isocyanatomethyl)-cyclohexane, 1,4-bis(isocyanatomethyl)-cyclohexane, bis(4-isocyanato-3-methyl-cyclohexyl)methane, 1-isocyanato-1-methyl-4(3)-isocyanatomethyl cyclohexane, alpha,alpha,alpha',alpha'-tetramethyl-1,3-xylylene diisocyanate, alpha,alpha,alpha',alpha'-tetramethyl-1,4-xylylene diisocyanate, 2,4-hexahydrotoluene diisocyanate, 2,6-hexahydrotoluene diisocyanate, derivatives of any of the foregoing aliphatic isocyanates, or a combination comprising at least one of the foregoing aliphatic isocyanates. The derivative of the aliphatic isocyanate can be a prepolymer derived from reaction of any of the foregoing isocyanates with a diol or a diamine, be a reaction product of any of the foregoing aliphatic isocyanates with a triol, for example glycerol, a trimerization derivative, for example an isocyanurate, or a dimerization derivative, for examples an uretonimine derivative. In some embodiments, the second isocyanate comprises 4,4'-dicyclohexylmethane diisocyanate or alpha,alpha,alpha',alpha'-tetramethyl-1,3-xylylene diisocyanate.

Advantageously, when the first and/or second isocyanate comprises an aromatic isocyanate, the amount of aromatic amine in the cured polyurethane adhesive can be reduced when the second isocyanate comprises an aliphatic amine. In some embodiments, the first isocyanate comprises an aromatic isocyanate and the second isocyanate comprises an aliphatic isocyanate. When the first and/or second isocyanates are aromatic isocyanates, the corresponding aromatic amines can be formed, by reaction of the aromatic isocyanate with water followed by loss of carbon dioxide. For example, 4,4'-diphenylmethane diisocyanate can form 4,4'-diphenylmethane diamine by reaction with water. The presence of aromatic amines in adhesives used in reverse osmosis modules is undesirable because of the risk of leaching of the aromatic amines into the water being purified during operation of the reverse osmosis modules. The present inventors have found that when the first and/or second isocyanate comprises an aromatic isocyanate, the amount of aromatic amine in the cured polyurethane adhesive can be reduced when the second isocyanate comprises an aliphatic isocyanate. Aromatic isocyanates are generally more reactive than aliphatic isocyanates. Without being bound by theory, the aliphatic isocyanate might serve as a scavenger for any aromatic amine formed by preferential reaction of the aromatic isocyanate with water. Thus in some embodiments, the second isocyanate comprises 4,4'-diphenylmethane diisocyanate and 4,4'-dicyclohexylmethane diisocyanate or alpha,alpha,alpha',alpha'-tetramethyl-1,3-xylylene diisocyanate.

The amount of aliphatic isocyanate in the second isocyanate can be 0 to 50 weight percent, based on the total weight of the second isocyanate. Within this range, the amount of aliphatic isocyanate can be greater than 0, 1, 2, 5 and less than or equal to 40, 30, or 20 weight percent. In some embodiments, the first isocyanate consists of aromatic isocyanate, and the second isocyanate comprises 1 to 50 weight percent aliphatic isocyanate and 49 to 50 weight percent aromatic isocyanate, based on the total weight of the second isocyanate.

In some embodiments, the adhesive composition further comprises a plasticizer. Useful plasticizers include, for example, esters of organic acids such as dicarboxylates, tricarboxylates, azelates, sebacates, maleates, fumarates, succinates, phthalates, adipates, trimellitates, glutarates, citrates, benzoates, dibenzoates, epoxidized soybean oil, esters of soybean oil, phosphate esters, and combinations comprising at least one of the foregoing plasticizers.

Examples of phthalate plasticizers include, but are not limited to, diethyl phthalate, di-n-butyl phthalate, diisobutyl phthalate, di-n-hexyl phthalate, bis(2-ethylhexyl) phthalate (dioctyl phthalate), di-n-octyl phthalate, diisooctyl phthalate, diisononyl phthalate, di($C_9$-linear/branched) phthalate, diisodecyl phthalate, di($C_{10}$-linear/branched) phthalate diundecyl phthalate, di($C_{11}$-linear/branched) phthalate, ditridecyl phthalate, di($C_{6-12}$-linear/branched alkyl) phthalates, butyl benzyl phthalate, and combinations comprising at least one of the foregoing phthalate plasticizers.

Dicarboxylate esters also include aliphatic diesters, such as adipates, glutarates, sebacates, maleates, fumarates, or a combination thereof. Examples of aliphatic diesters include dibutoxyethyl adipate, dibutoxyethoxyethyl adipate, bis(2-ethylhexyl) adipate, dioctyl adipate, dimethyl adipate, monomethyl adipate, diisodecyl adipate, diisononyl adipate, di($C_{7-9}$-linear and branched alkyl) adipate, bis(2-ethylhexyl) sebacate, bis(2-ethylhexyl) azelate, butyl fumarate, diisobutyl fumarate, bis(2-ethylhexyl) fumarate, diethyl maleate, dimethyl maleate, diheptyl adipate, dioctyl adipate, dinonyl adipate, dibutyl sebacate, dibutyl maleate, diisobutyl maleate, triethylene glycol dihexanoate, tetraethylene glycol diheptanoate, diisononyl 1,2-cyclohexanedicarboxylate, and a combination comprising at least one of the foregoing aliphatic diesters.

Tricarboxylate ester plasticizers include trimellitate esters and citrate esters. Specific examples of useful trimellitate esters include trimethyl trimellitate, tri(2-ethylhexyl) trimellitate, tri(n-octyl, n-decyl) trimellitate, tri-(heptyl, nonyl) trimellitate, tri($C_{7-9}$-alkyl) trimellitate, n-octyl trimellitate, and a combination thereof. Specific examples of useful citrates include tri-n-butyl citrate, triethyl citrate, trimethyl citrate, acetyl triethyl citrate, tributyl citrate, acetyl tributyl citrate, trioctyl citrate, acetyl trioctyl citrate, trihexyl citrate, acetyl trihexyl citrate, butyryl trihexyl citrate, and a combination comprising at least one of the foregoing.

Soybean oil plasticizers include methyl soyate, ethyl soyate, propyl soyate, and a combination thereof.

Phosphate ester plasticizers include o-isopropylphenyl diphenyl phosphate, triethyl phosphate, tributyl phosphate, trioctyl phosphate, tributoxyethyl phosphate, butylphenyl diphenyl phosphate, cresyl diphenyl phosphate, triphenyl phosphate, tricresyl phosphate, triisopropyl phenyl phosphate, 2-ethylhexyl phosphate, isodecyl diphenyl phosphate, trixylenyl phosphate, diphenyl octyl phosphate, and a combination comprising at least one of the foregoing.

Other examples of useful plasticizers include diethylene glycol dibenzoate, dipropylene glycol dibenzoate, diethylene glycol dibenzoate, dioctyl terephthalate, epoxidized vegetable oils, alkyl sulfonic acid phenyl ester, N-ethyl toluene sulfonamide (ortho and para isomers), N-(2-hydroxypropyl) benzene sulfonamide, N-(n-butyl)benzene sulfonamide, acetylated monoglycerides, glycol esters, polyether esters, polybutene, polyester adipate, polyester glutarate, glycol, polyethers, organophosphates, other polymeric plasticizers, and a combination comprising at least one of the foregoing.

Commercial sources of plasticizers include: Velsicol Chemical, Rosemont, Ill., USA, for BENZOFLEX™ plasticizers, for example dipropylene glycol dibenzoate (BENZOFLEX™ 9-88), a mixture of dipropylene glycol dibenzoate and diethylene glycol dibenzoate (BENZOFLEX™ 50), and polypropylene glycol dibenzoate (BENZOFLEX™ 400); Exxon Mobil Chemical, Houston, Tex., USA for JAYFLEX™ plasticizers, for example di($C_{6-12}$-linear/branched alkyl) phthalate (JAYFLEX™ L771P), diisodecyl phthalate (JAYFLEX™ DIDP), and dioctyl phthalate (JAYFLEX™ DOP); Monsanto, for DIOCTYL™, SANTICIZER™, and DIBUTYL™ plasticizers; Bayer, DE, for ADIMOLL™, DISFLAMOLL™, MESAMOLL™, UNIMOLL™, TEGDA™, TRIACETIN™ and ULTRAMOLL™ plasticizers; and Dow Chemicals, DE, USA, for epoxidized soybean oil (FLEXOL™ EPO).

In some embodiments, the plasticizer comprises an adipate ester, a phthalate ester, a phosphate ester, or a combination comprising at least one of the foregoing plasticizer. For example, the plasticizer can comprise dioctyl adipate, a di($C_{6-12}$-linear/branched alkyl) phthalate, a di($C_9$-linear/branched alkyl) phthalate, a di($C_{11}$-linear/branched alkyl) phthalate, ditridecyl phthalate, cresyl phosphate, or a combination comprising at least one of the foregoing. In some embodiments, the plasticizer is a long chain, branched adipate diester having low volatility, for example, dibutoxyethyl adipate, dibutoxyethoxyethyl adipate, bis(2-ethylhexyl) adipate, dimethyl adipate, monomethyl adipate, diisodecyl adipate, diisononyl adipate, di($C_{7-9}$-linear and branched alkyl) adipate, or combinations comprising at least one of the foregoing. In some embodiments, the plasticizer is bis(2-ethylhexyl) adipate, also known as dioctyl adipate.

Since the adhesive composition comprises an isocyanate-containing prepolymer and a second isocyanate, it is desirable that the plasticizer has a low water content. Any water present in the plasticizer can react with any isocyanate groups in the first part of the adhesive composition, forming carbon dioxide, which could result in bubbles in the cured polyurethane adhesive, and also adversely affect the crosslink density. Therefore it is desirable that the plasticizer has a maximum water content of less than or equal to about 0.1 weight percent, specifically less than or equal to 0.09, 0.08, 0.07, 0.06, 0.05, or 0.04 weight percent, based on the weight of the plasticizer. It is also desirable that the plasticizer does not have any active hydrogen atoms, for example hydroxyl, primary amino, and secondary amino groups, since these can also react with isocyanate groups in the adhesive composition.

The plasticizer can be present in the first part of the adhesive composition, the second part of the adhesive composition or in both the first and second parts of the adhesive composition. The adhesive composition can comprise 0 to 35 weight percent plasticizer, based on the total weight of the adhesive composition. Within this range, the adhesive composition can comprise greater than or equal to 0.05, 0.5, 1, 5, or 10 weight percent and less than or equal to 30, 25, 20, or 15 weight percent plasticizer. In some embodiments, the adhesive composition comprises 0.5 to 35 weight percent plasticizer, based on the total weight of the adhesive composition.

In some embodiments, the adhesive composition further comprises an additive. The additive can be any additive known in the art, provided it does not have any active hydrogen atoms reactive with the first isocyanate, the isocyanate-containing prepolymer and the second isocyanate. In some embodiments, the adhesive composition further comprises an additive comprising defoamers, flow and leveling agents, thixotropic agents, desiccants, catalysts, UV stabilizers, antioxidants, dispersing agents, wetting agents, pigments, dyes, fillers, and a combination comprising at least one of the foregoing additives. Examples of fillers include talc, calcium carbonate, barium sulfate, magnesium oxide, clay, mica, or a combination comprising at least one of the foregoing fillers.

The adhesive composition can comprise 0.005 to 10 weight percent, specifically 0.01 to 5 weight percent, or more specifically 0.01 to 4 weight percent, of total additives, based on the weight of the adhesive composition, wherein the additive is present in the first part, the second part, or both the first part and the second part of the composition.

In some embodiments, the adhesive composition further comprises a desiccant. The desiccant is any hygroscopic substance which is capable of adsorbing moisture, provided it has limited or no reactivity with the adhesive composition. The desiccant advantageously adsorbs or reacts with water, thereby preventing the reaction of the water with the first isocyanate, the second isocyanate, and the isocyanate-containing prepolymer. In some embodiments, the desiccant is an inorganic substance, for example activated alumina, silica gel, aluminosilica gel, zeolites, activated bentonite, metal oxides, molecular sieves, activated carbon, or a combination comprising at least one of the foregoing inorganic desiccants. The inorganic desiccant can be in the form of a powder, mesh, cylindrical pellets, beads, or spheres. In some embodiments, the desiccant comprises particulate molecular sieves. Molecular sieves have the general chemical formula $M_x[(AlO_2)_x(SiO_2)_y] \cdot zH_2O$ in powder form, for example 3 A and 5 A molecular sieves, in which M is Ca and Na. 3 A and 5 A molecular sieves are available from UOP as 3 A MOLSIV™ and 5 A MOLSIV™ Adsorbents, respectively. In some embodiments, the desiccant is 3 A molecular sieves, 5 A molecular sieves, or a combination thereof. The desiccant can be added to the second part of the adhesive composition in an amount of 0.5 to 10 weight percent, specifically 0.5 to 6 weight percent, based on the total weight of the second part.

In some embodiments, the adhesive composition further comprises a urethane catalyst and a rheology modifier. The urethane catalyst can be present in the second part of the adhesive composition. Examples of urethane catalysts include tin catalysts such as dialkyl tin dialkanoates, for example, dimethyltin dineodecanoate, available as FOMREZ™ UL-28 from Momentive Performance Materials, which provides very short gel and tack-free times as well as good solubility in polyurethane compositions. Other examples of urethane catalysts include, but are not limited to: stannous octoate, commercially available as DABCO™ T-9 from Air Products, Allentown, Pa., USA; an organotin catalyst commercially available as DABCO™ 131; 1,4-diazabicyclooctane, available as DABCO™ Crystalline Catalyst; N-cetyl-N,N-dimethylamine, available as DABCO™ B-16; dibutyltin dilaurate, available as DABCO™ T-12; dibutyltin diacetate, available as METACURE™ T-1; a blend of zinc neodecanoate, bismuth neodecanoate and neodecanoic acid, available as BiCat 8 from Shepherd Chemical Company, Norwood, Ohio, USA; ferric acetylacetonate, available as AMSPEC™ GCR-56 from Amspec Chemical Corporation, Bear, Del., USA; and oleic acid, available as Oleic Acid 105 from Acme-Hardesty Company, Blue Bell, Pa., USA.

In some embodiments, the adhesive composition further comprises a rheology modifier. The rheology modifier can be present in the first part of the adhesive composition, the second part of the adhesive composition, or in both parts. The rheology modifier can be a thixotropic agent. A thixotropic agent is an additive whose viscosity is time-dependent as well as shear-dependent. A pseudoplastic, or shear thinning, substance, has high viscosity when measured at low shear rates, but has reduced viscosity at high shear rates. However the viscosities are independent of time. When a thixotropic agent is subject to a constant shear rate, viscosity decreases with time. When the shear is removed, the viscosity returns to its original higher value. Thixotropic agents include, but are not limited to, inorganic substances, for example fumed silica, amorphous silicon dioxide, clays, such as bentonite and hectorite, talc, organoclays, modified urea polymers, and the like; and combinations thereof. The rheology modifier can also be a flow and leveling agent. An example of a flow and leveling agent is a medium molecular weight, acrylic-based polymer available as MODAREZ™ MFP from Synthron. Rheology modifiers are also available from BYK Additives/Elements Specialties, Wallingford, Conn., USA.

In some embodiments, the adhesive composition further comprises a defoamer. The defoamer can be present in the first part of the adhesive composition, the second part of the adhesive composition, or in both parts. The defoamer can be any defoamer known in the art, provided it does not have any active hydrogen atoms reactive with the first isocyanate, the isocyanate-containing prepolymer and the second isocyanate. The defoamer can be a silicone-based defoamer, for example, an alkyl aryl siloxane polymer, such as methylhexylisopropylbenzyl siloxane, which is available as SF8843 from Momentive Performance Materials Holdings. The defoamer can also be silicone-free, for example it can be an isoparaffin, such as BYK™ 054, which is available from BYK USA. When present, the first or second parts of the multi-part polyurethane composition can each comprise 0.01 to 0.1 wt % of the defoamer, based on the total weight of the first or second part. In another embodiment, the first and second parts of the multi-part polyurethane composition can each comprise 0.005 to 0.05 wt % of the defoamer. The first part of the adhesive composition can comprise about 0.01 to about 0.1 weight percent, or 0.005 to 0.05 weight percent, based on the weight of the first part, of defoamer; and the second part of the adhesive composition can comprise about 0.01 to about 0.1 weight percent, or 0.005 to 0.05 weight percent, based on the weight of the second part, of defoamer.

The viscosity of the first part of the adhesive composition can be 500 to 50,000 centipoise. Within this range, the viscosity of the first part can be greater than or equal to 500, 1,000 or 2000 centipoise and less than or equal to 40,000, 35,000 or 30,000 centipoise. The viscosity of the second part of the adhesive composition can be 500 to 100,000 centipoise. Within this range, the viscosity of the second part can be greater than or equal to 1,000, 5,000, or 10,000 centipoise and less than or equal to 90,000, 80,000 or 70,000 centipoise. The initial viscosity of the adhesive composition after mixing the first part and the second part can be 5,000 to 70,000 centipoise. Within this range, the viscosity of the adhesive composition after mixing the first part and the second part can be greater than or equal than 5,000 centipoise and less than or equal to 40,000 or 35,000 centipoise.

A process for forming an isocyanate-containing prepolymer having a second reactive isocyanate species, the process comprising: reacting a first isocyanate and at least one polyol to form an isocyanate-containing prepolymer; and mixing the isocyanate-containing prepolymer with a second isocyanate; wherein the second isocyanate is essentially unreacted with the first isocyanate, the at least one polyol, and the isocyanate group-containing prepolymer. Variations in the first part of the adhesive composition described herein are likewise applicable to the process for forming an isocyanate-containing prepolymer having a second reactive isocyanate species.

The adhesive composition has a stoichiometry of 1:1 to 1.2:1, wherein stoichiometry is defined as the ratio of equivalents of isocyanate functionality to equivalents of hydroxyl functionality in the composition. Multi-part polyurethane compositions used to prepare polyurethanes can be characterized by "stoichiometry", which is calculated according to the equation:

$$\text{Stoichiometry} = \frac{\text{Moles}_{NCO}}{\text{Moles}_{OH} + \text{Moles}_{HOH} + \text{Moles}_{NH}}$$

wherein "Moles$_{NCO}$" is the total moles of isocyanate groups in the multi-part polyurethane composition, "Moles$_{OH}$" is the total moles of OH groups in the multi-part polyurethane composition from sources other than water (including OH groups from alcohols and carboxylic acids), "Moles$_{HOH}$" is the total moles of OH groups in the multi-part polyurethane composition from any water present, which is twice the moles of water, and "Moles$_{NH}$" is the moles of any NH groups in the reaction mixture. Stoichiometry is related to "isocyanate index", often used in the art, which is equivalent to the stoichiometry times 100. When the multi-part polyurethane composition molar ratio of isocyanate groups to hydroxyl groups is 1:1 and no water or NH groups are present in the polyurethane mixture, the stoichiometry is 1:1, and the isocyanate index is 100. The adhesive composition can have a stoichiometry of 0.9:1 to 1.25:1, specifically 1:1 to to 1.2:1, and more specifically 1:1 to 1.1:1.

The adhesive composition can contain any weight ratio of the first part to the second part. For example, the adhesive composition can contain about 10 to about 90 weight percent of the first part and about 10 to about 90 weight percent of the second part. Within this range, the adhesive composition can contain about 20 to about 80 weight percent of the first part and about 20 to about 80 weight percent of the second part, or about 30 to about 75 weight percent of the first part and about 25 to about 70 weight percent of the second part. In some embodiments, the adhesive composition comprises 50 to 55 weight percent of the first part and 45 to 50 weight percent of the second part, i.e. the first and second parts can be present in a 1:1 to 1.2:1 weight ratio.

A polyurethane adhesive is made by mixing the first part and the second part of the adhesive composition in a 1:1 to 1.2:1 weight ratio of the first part to the second part to form a mixture, and curing the mixture. Variations of the adhesive composition described herein are likewise applicable to the polyurethane adhesive. Mixing of the first part and second part can be done by hand mixing, static mixing, or dynamic mixing. In hand mixing the first and second parts is done manually, as implied by the name. In static mixing, a static mixer, which has no moving parts, is used. A static mixer is an array of static mixer elements, including conduits, plates, or baffles, located inside a pipe. External pumps move the first and second parts through the static mixer. The fluid is divided, recombined, spread, rotated, eddied, or swirled as it passes through the static mixer. Static mixing can be used when the mixing ratio of the first part to the second part is 100:100 to 100:20 by volume, when the first and second parts exhibit similar viscosities, or when the adhesive composition has a relatively long work life. Dynamic mixing can be used when the first and second parts meet one or more of the following criteria: (a) there is a significant difference between the volumes of the first and second parts, for example when the mixing ratio of the first part to the second part is greater than or equal to 100:5; (b) the viscosities of the first and second parts are far apart; (c) the adhesive composition has a short mix time; or (d) very low flow rates are required. The first part can be added to the second part, the second part can be added to the first part, or, in the alternative the first part and the second part can be simultaneously added to the same vessel.

The adhesive composition can be used to form adhesive bonds between two materials. For example, the adhesive composition can be used to bond films or sheets together. Thus in some embodiments, an article comprises the polyurethane adhesive made by mixing the first part and the second part of the adhesive composition in a 1:1 to 1.2:1 weight ratio of the first part to the second part to form a mixture, and curing the mixture. The adhesive composition can be cured at 0 to 80° C. for 1 to 168 hours to form the polyurethane adhesive. The curing can be done under conditions employed by end-users for epoxy-amine and other two-part polyurethane adhesives. For example, the curing can be done in two stages, with the initial curing at room temperature and the final curing at elevated temperature. For example, the adhesive composition can be cured first at about 25° C. for about 24 hours, then at about 65° C. for about 16 hours or at about 80° C. for about 4 hours. Variations in the adhesive composition described herein are likewise applicable to an article comprising the polyurethane adhesive made by mixing the first part and the second part of the adhesive composition in a 1:1 to 1.2:1 weight ratio to form a mixture, and curing the mixture.

When the polyurethane adhesive is fully cured, it can have certain physical properties that are beneficial for use in reverse osmosis modules. When fully cured, the polyurethane adhesive can have a Shore hardness of 30 D to 90 D, measured in accordance with ASTM D2240-05. Within this range, the polyurethane adhesive can have a Shore hardness of greater than or equal to 40 D or 50 D and less than or equal to 80 D or 70 D. When fully cured, the polyurethane adhesive can also have a tensile strength of 1,000 to 10,000 pounds per square inch (psi), as measured in accordance with ASTM D412-06A using an Instron Tensiometer. Within this range, the tensile strength can be greater or equal to 1,500 psi and less than or equal to 5,000 or 4,000 psi.

The article can comprise a semipermeable membrane or hollow fibers. After mixing the first part and second part of the adhesive composition, it can be applied to a semipermeable membrane and cured to form an adhesive bond to the semipermeable membrane. Thus in some embodiments, the article comprising the polyurethane adhesive made by mixing the first part and the second part of the adhesive composition in a 1:1 to 1.2:1 weight ratio of the first part to the second part to form a mixture, and curing the mixture, further comprises a semipermeable membrane, wherein the polyurethane adhesive adheres to the semipermeable membrane. The semipermeable membrane can be a component of a separation module for purification of liquids, for example a reverse osmosis module, a nanofiltration module, an ultrafiltration module, or a microfiltration module. In some embodiments, the article comprising the polyurethane adhesive and semipermeable membrane is a reverse osmosis module. An example of a reverse osmosis module 10 is illustrated in FIG. 1, wherein the adhesive composition 12 is shown applied to at least a portion of a semipermeable membrane 14. The example shown in FIG. 1 is only used for illustration purposes and is not meant to limit the scope of articles comprising the adhesive composition. Variations in the adhesive composition described herein are likewise applicable to the semipermeable membrane and the reverse osmosis module comprising the polyurethane adhesive made by mixing the first part and the second part of the adhesive composition in a 1:1 to 1.2:1 weight ratio of the first part to the second part to form a mixture, and curing the mixture.

The adhesive composition can be applied to a semipermeable membrane using any technique known in the art, for example by using a slot die coater. The adhesive composition can be applied as a layer having any desired thickness. For example, the adhesive composition can be applied to a semipermeable membrane in an about 0.2 to about 4 mil thick layer.

The adhesive compositions disclosed herein readily penetrate porous support layers of reverse osmosis membranes to form strong and durable bonds to the semipermeable layer. Osmotic blistering in reverse osmosis membranes utilizing the present adhesive composition is reduced or prevented, thereby reducing or preventing veining and lightning bolt failures previously observed. Thus in some embodiments, a method for reducing or preventing osmotic blistering of a semipermeable membrane otherwise subject thereto, comprises: forming the adhesive composition disclosed herein; mixing the first part and second part of the adhesive composition to form a mixture; applying the mixture to a semipermeable membrane in an amount sufficient to secure the semipermeable membrane to a porous support; curing the mixture to form a polyurethane adhesive; and filtering a solvent through the semipermeable membrane by reverse osmosis; wherein the polyurethane adhesive reduces or prevents osmotic blistering of the semipermeable membrane. Variations in the adhesive composition described herein are likewise applicable to the method for reducing or preventing osmotic blistering of a semipermeable membrane otherwise subject thereto The adhesive compositions disclosed herein readily penetrate interstices and voids of porous support layers of reverse osmosis membranes to form strong and durable bonds to the semipermeable layer. The adhesive bonds are strong enough to resist the high pressures to which the semipermeable membranes are subject to. Moreover, the cured adhesive is resistant to alkaline cleaning fluids, which are commonly used. Advantageously, osmotic blistering in reverse osmosis membranes utilizing the present adhesive composition is reduced or prevented, thereby reducing or preventing veining and lightning bolt failures previously observed. Moreover, the present adhesive composition also reduces the width of the bond line (adhesive composition in contact with the membrane surface), thereby reducing the amount of adhesive composition needed to form strong and durable bonds.

This invention includes at least the following embodiments.

Embodiment 1

An adhesive composition comprising: a first part comprising:
an isocyanate group-containing prepolymer comprising a reaction product of a first isocyanate and at least one polyol;

and a second isocyanate that is essentially unreacted with the first isocyanate, the at least one polyol, and the isocyanate group containing prepolymer; and a second part comprising at least two polyols; wherein the adhesive composition is essentially free of diluent oils and solvents.

Embodiment 2

The adhesive composition of embodiment 1, wherein the second isocyanate is the same as the first isocyanate.

Embodiment 3

The adhesive composition of embodiment 1 or 2, wherein polybutadiene diols and polyisobutylene diols are absent from the second part.

Embodiment 4

The adhesive composition of any of embodiments 1-3, wherein polybutadiene diols and polyisobutylene diols are absent from the first part.

Embodiment 5

The adhesive composition of any of embodiments 1-4 further comprising from 0.5 to 35 weight percent of a plasticizer, based on the total weight of the adhesive composition.

Embodiment 6

The adhesive composition of any of embodiments 1-5, wherein the first part of the polyurethane composition has a total NCO content of 10 to 35 weight percent, based on the total weight of the first part, as measured in accordance with ASTM D2572.

Embodiment 7

The adhesive composition of any of embodiments 1-6, wherein the first isocyanate and the second isocyanate are independently 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate and cyclohexane-1,4-diisocyanate, 1-isocyanato-2-isocyanatomethyl cyclopentane, 1-isocyanato-3-isocyanatomethyl-3,5,5-trimethyl-cyclohexane, 4,4'-dicyclohexylmethane diisocyanate, 2,4'-dicyclohexylmethane diisocyanate, 1,3-bis(cyclohexyl) diisocyanate, 1,4-bis-(isocyanatomethyl)-cyclohexane, bis(4-isocyanato-3-methyl-cyclohexyl)methane, 1-isocyanato-1-methyl-4(3)-isocyanatomethyl cyclohexane, alpha,alpha,alpha',alpha'-tetramethyl-1,3-xylylene diisocyanate, alpha,alpha,alpha',alpha'-tetramethyl-1,4-xylylene diisocyanate, 2,4-hexahydrotoluene diisocyanate, 2,6-hexahydrotoluene diisocyanate, 1,3-phenylene diisocyanate, 1,4-phenylene diisocyanate, 2,4-toluene diisocyanate, 2,6-toluene diisocyanate, 2,4-diphenylmethane diisocyanate, 1,5-diisocyanato naphthalene, 4,4'-diphenylmethane diisocyanate, a chemical modification of at least one of the foregoing isocyanates, a prepolymer derived from reaction of at least one of the foregoing isocyanates with a diol or a diamine, or combinations comprising at least one of the foregoing isocyanates.

Embodiment 8

The adhesive composition of any of embodiments 1-6, wherein the first isocyanate and second isocyanate are independently monomeric diphenylmethane diisocyanate, a modified diphenylmethane diisocyanate having an average of greater than 2 and less than or equal to 4 isocyanate groups per molecule, or a combination comprising at least one of the foregoing isocyanates.

Embodiment 9

The adhesive composition of any of embodiments 1-6, wherein the first isocyanate and second isocyanate are independently a modified diphenylmethane diisocyanate selected from a carbodiimide-modified diphenylmethane diisocyanate, a prepolymer derived from reaction of diphenylmethane diisocyanate with a diol or diamine, or a combination comprising at least one of the foregoing isocyanates.

Embodiment 10

The adhesive composition of any of embodiments 1-9, wherein the at least two polyols of the second part comprise castor oil, a castor oil derivative, an ester of ricinoleic acid, a polyether polyol, a polyol derived from natural oils, a polyol derived from fats, a polyether polyol, a polylactone, a polyester polyol, a polybutadiene polyol, a polyisobutylene diol, a polyol having amine functionality, or a combination comprising at least one of the foregoing polyols.

Embodiment 11

The adhesive composition of any of embodiments 1-9, wherein the at least two polyols of the second part comprise a polyether polyol, castor oil, a castor oil derivative, an ester of ricinoleic acid, a polyol having amine functionality, or combinations comprising at least two of the foregoing polyols.

Embodiment 12

The adhesive composition of any of embodiments 1-11, wherein the at least one polyol of the first part comprises castor oil, a castor oil derivative, an ester of ricinoleic acid, a polyether polyol, a polyol derived from natural oil, a polyol derived from fats, a polyether polyol, a polylactone, a polyester polyol, a polybutadiene polyol, a polyisobutylene diol, a polyol having amine functionality, or a combination comprising at least one of the foregoing polyols.

Embodiment 13

The adhesive composition of any of embodiments 1-11, wherein the at least one polyol of the first part comprises castor oil, a castor oil derivative, an ester of ricinoleic acid, a polyether polyol, a polybutadiene polyol, a polyisobutylene diol, or a combination comprising at least one of the foregoing polyols.

Embodiment 14

The adhesive composition of any of embodiment 1-11, wherein the at least one polyol of the first part consists of castor oil or a castor oil derivative.

Embodiment 15

The adhesive composition of any of embodiments 1-11, wherein the at least one polyol of the first part comprises castor oil or a castor oil derivative, and a polyether diol.

Embodiment 16

The adhesive composition of any of embodiments 1-11, wherein the at least one polyol of the first part consists of a tetrol.

Embodiment 17

The adhesive composition of any of embodiments 1-11, wherein the at least one polyol of the first part consists of polybutadiene polyol.

Embodiment 18

The adhesive composition of any of embodiments 1-9 and 12-13, wherein the at least two polyols of the second part comprise castor oil, a castor oil derivative, an ester of ricinoleic acid, a polyol derived from natural oils, a polyether polyol, or a combination comprising at least two of the foregoing polyols.

Embodiment 19

The adhesive composition of any of embodiments 1-9 and 12-13, wherein the at least two polyols of the second part comprise a transesterification product of castor oil with pentaerythritol, and a polyether triol.

Embodiment 20

The adhesive composition of any of embodiments 1-9 and 12-13, wherein the at least two polyols of the second part comprise castor oil, a transesterification product of castor oil with pentaerythritol, a polyol derived from natural oils, a polyether tetrol, or a combination comprising at least one of the foregoing polyols.

Embodiment 21

The adhesive composition of any of embodiments 1-9 and 12-13, wherein the at least two polyols of the second part comprise castor oil, a polyether tetrol, a polyol having amine functionality, or a combination comprising at least two of the foregoing polyols.

Embodiment 22

The adhesive composition of any of embodiments 1-21, wherein the first isocyanate comprises an aromatic isocyanate and the second isocyanate comprises an aliphatic isocyanate.

Embodiment 23

The adhesive composition of any of embodiments 1-7 and 10-22, wherein the first isocyanate comprises an aromatic isocyanate and the second isocyanate comprises 1 to 50 weight percent aliphatic isocyanate and 49 to 50 weight percent of aromatic isocyanate, based on the total weight of the second isocyanate.

Embodiment 24

The adhesive composition of any of embodiments 1-23, further comprising a desiccant.

Embodiment 25

A polyurethane adhesive made by mixing the first part and the second part of the adhesive composition of any of embodiments 1-24 in a 1:1 to 1.2:1 weight ratio of the first part to the second part to form a mixture, and curing the mixture.

Embodiment 26

An article comprising the polyurethane adhesive of embodiment 25.

Embodiment 27

The article of embodiment 26, wherein the article further comprises a semipermeable membrane, wherein the polyurethane adhesive adheres to the semipermeable membrane.

Embodiment 28

The article of embodiment 27, wherein the article is a reverse osmosis module.

Embodiment 29

A method for preventing or reducing osmotic blistering of a semipermeable membrane otherwise subject thereto, the method comprising: forming the adhesive composition of any of embodiments 1-24; mixing the first part and second part of the adhesive composition to form a mixture; applying the mixture to a semipermeable membrane in an amount sufficient to secure the semipermeable membrane to a porous support; curing the mixture to form a polyurethane adhesive; and filtering a solvent through the semipermeable membrane by reverse osmosis; wherein the polyurethane adhesive prevents or reduces osmotic blistering of the semipermeable membrane.

Embodiment 30

A process for forming an isocyanate-containing prepolymer having a second reactive isocyanate species, the process comprising: reacting a first isocyanate and at least one polyol to form an isocyanate-containing prepolymer; and mixing the isocyanate-containing prepolymer with a second isocyanate; wherein the second isocyanate is essentially unreacted with the first isocyanate, the at least one polyol, and the isocyanate group-containing prepolymer.

The following examples are provided to assist one skilled in the art to further understand certain embodiments of the present invention. These examples are intended for illustration purposes and are not to be construed as limiting the scope of the various embodiments of the present invention thereto.

EXAMPLES

The raw materials utilized in these examples are described below in Table 1.

TABLE 1

Materials

| Component | Description |
|---|---|
| MDI CD | A uretonimine-modified diphenylmethane diisocyanate (MDI), having an isocyanate functionality of about 2.2, 29.5 wt % isocyanate content, and an equivalent weight of 143 g/mole, available as MONDUR ™ DC from Covestro, Leverkusen, DE. |
| MDI MLQ | A monomeric diphenylmethane diisocyanate (MDI) containing a high percentage of 2,4'-diphenylmethane diisocyanate, and having an isocyanate functionality of about 2, and an isocyanate content of 33.4 wt %, available as MONDUR ™ MLQ from Covestro, Leverkusen, DE. |
| MDI PF | Prepolymer composition from 4,4'-diphenylmethane diisocyanate containing 50-60 wt % 4,4'-diphenylmethane diisocyanate, 40-50 wt % prepolymer (dipropylene glycol, polymer with 4,4'-diphenylmethane diisocyanate), and 1-10 wt % diphenylmethane diisocyanate mixed isomers; CAS Reg. No. 52747-01-0; having an NCO content of 22.6-23.1 wt %; and available as MONDUR ™ PF from Covestro, Leverkusen, DE;. |
| $H_{12}$MDI | 4,4'-Dicyclohexylmethane diisocyanate, C.A.S. Reg. No. 5124-30-1, available as DESMODUR ™ W from Covestro, Leverkusen, DE. |
| TMXDI | Alpha,alpha,alpha',alpha'-tetramethyl-1,3-xylylene diisocyanate, C.A.S. Reg. No. 2778-42-9, having an NCO content of 34.4 wt %, and available as TMXDI ™ (META) Aliphatic Isocyanate from Allnex, Brussels, Belgium. |
| CO-1 | Castor oil, available as Castor Oil #1 from Vertellus, and having a water content of less than 0.04 wt %. |
| CO-2 | Castor oil transesterified with pentaerythritol. |
| POLY-G 76-635 | A polyether triol, specifically a reaction product of ethylene oxide and propylene oxide with glycerol; C.A.S. Reg. No. 9082-00-2, available from Monument Chemical as POLY-G ™ 76-635; and having a number average molecular weight of 265 g/mol, a hydroxyl no. of 648 mg KOH/g, and a maximum acid no. of 0.05 mg KOH/g. |
| POLY-G 20-56 | A polyether diol, specifically polypropylene glycol; C.A.S. Reg. No. 25322-69-4, available from Monument Chemical as POLY-G ™ 20-56; and having a number average molecular weight of 2,000 g/mol, a hydroxyl no. of 56 mg KOH/g, and a maximum acid no. of 0.05 mg KOH/g. |
| PEP-450 | Reaction product of 1 mole of pentaerythritol and 4.5 moles of propylene oxide, having a hydroxyl number of 560 mg KOH/g, a number average molecular weight of 400 g/mole, and a Brookfield viscosity of 2500 cP at 25° C., available from BASF as PLURACOL ™ PEP-450. |
| R20LM | A low molecular weight, hydroxyl-terminated polybutadiene diol, having a molecular weight of 1,300 g/mol, a hydroxyl value of 1.8 milliequivalents/g, and a viscosity of 1500 cP at 30 C., available from Cray Valley as POLY BD ™ R20LM. |
| QUAD | Tetra-(2-hydroxypropyl)ethylenediamine, having a molecular weight of 292 g/mol, and a viscosity of 900 cP at 60° C., available from BASF as QUADROL ™ Polyol. |
| D230 | A primary amine-terminated poly(propylene oxide), having a molecular weight of 230 g/mol, and an average amine hydrogen equivalent weight of 60 g/equivalent, available from Huntsman as JEFFAMINE ™ D230. |
| DOA | Bis(2-ethylhexyl) adipate, C.A.S. Reg. No. 103-23-1, a plasticizer available from Parchem Fine and Speciality Suppliers. |
| 3A/5A | 3A/5A Molecular sieves, an alkali aluminosilicate, calcium form, of Type A crystal structure, available from UOP LLC as MOLSIV ™ Adsorbent. |
| $SiO_2$ | Fumed silica, a thixotropic rheology modifier. |
| ACP-1400 | A silicone defoamer, available as XIAMETER ™ ACP-1400, from Dow-Corning. |
| SF-8843 | Methylhexylisopropylbenzyl siloxane defoamer, available as SF 8843 from Momentive Performance Materials. |
| MFP | Medium molecular weight, acrylic-based flow and leveling agent, available as MODAREZ ™ MFP from Synthron. |
| BC | Benzoyl chloride, a polyurethane stabilizer available from Sigma Aldrich. |
| UL-28 | Dimethyltin dineodecanoate, a polyurethane catalyst, available as FOMREZ ™ UL-28 from Momentive Performance Materials. |
| UV-5411 | 2-(2-Hydroxy-5-tert-octylphenyl)benzotriazole, a UV light absorber, available as CYASORB ™ UV-5411 from Solvay. |

TABLE 2

Test Methods

| | |
|---|---|
| Isocyanate Content | ASTM D2572-97 (2010) |
| Viscosity Part A, 25° C. | ASTM D2393-86 |
| Viscosity Part B, 25° C. | ASTM D2393-86 |
| Initial Mixed Viscosity, 25° C. | ASTM D2393-86 |
| Worklife, 25° C. | ASTM D2393-86 |
| Shore Hardness | ASTM D2240-05 |
| Tensile Strength | ASTM D412-06A |
| Elongation | ASTM D412-06A |
| Tear Strength | ASTM D624-00 |

General Procedure for Preparation of Prepolymers (Parts A)

Specific raw materials and amounts are provided in Table 3 below. Water content for castor oil was ≤0.04 wt. %. A jacketed reaction vessel equipped for agitation, vacuum, heating, and cooling was cleaned and dried prior to use. Weighed first isocyanate, and then defoamer(s) and optionally plasticizer, benzoyl chloride, antioxidant, and flow and leveling additives were then added. With agitation, 90 mole % (based on isocyanate) of polyol was added, with cooling water circulated through the jacket as needed so that the temperature did not exceed 85° C. After all the polyol was added, cooling water was turned off, the vessel was sealed under vacuum (about 27" Hg), and the vessel was then heated with steam at 80-85° C. for 3 hours to form prepolymer. The vessel was cooled to less than 70° C., and a sample was then analyzed for NCO content (ASTM D 2572). Based on the analyzed NCO content, additional amounts of the polyols or first isocyanate required to adjust the in-process NCO content in the prepolymer to the desired level was then calculated. Then the additional amount of first polyol or first isocyanate was added and reacted for an additional 2 hours. Once the target in-process NCO content was achieved, the vessel was cooled to less than 70° C. A calculated amount of second polyisocyanate based on the final target NCO content was added, and stirring was continued for 1 hour. Once the target final NCO content was achieved, the prepolymer was filtered through a 200-micrometer filter bag.

General Procedure for Preparation of Parts B

Specific raw materials and amounts are provided in Table 1. A jacketed reaction vessel equipped for agitation, vacuum, heating, and cooling was cleaned and dried prior to use. The polyols, DOA, MFP in amounts listed in Table 3 were added to the reaction vessel, and the vessel contents were stripped until the water content was ≤0.04 wt. %. The contents were cooled to less than 100° F. Molecular sieves, fumed silica, catalyst, and D230 were added, and the mixture was agitated at high shear for 45 minutes. The mixture was sampled for work life determination. Additional catalyst was added at less than 100° F., and the mixture was blended for 30 minutes when the work life was about 25 minutes at 25° C. for a 200-gram mass.

General Procedure for Mixing Parts A and B to Form Adhesive Composition

100 Parts by weight of the prepolymers (Parts A) were mixed with the amounts of Parts B listed in Table 3 at 25° C. Mixing was done by pumping Parts A and B through a Nordson static mixer consisting of a pneumatically-actuated twin snuffer valve fitted within a plastic static mixing tube having a 0.37-inch inner diameter, a 14.2-inch length, and 40 mixing elements. Once applied to a substrate, the adhesive compositions were allowed to cure at 25° C. Physical properties of Parts A and B, and the polyurethane adhesives obtained by mixing and curing Parts A and B, are summarized in Table 3.

TABLE 3

Adhesive Compositions - Examples 1-9 and Comparative Examples 1-2

| | Relative Amount (wt %) | | | | | |
|---|---|---|---|---|---|---|
| Component | Ex. 1 | Ex. 2 | Ex. 3 | Ex. 4 | Ex. 5 | Ex. 6 |
| Part A | | | | | | |
| MDI PF (1st isocyanate) | — | — | 52.00 | — | — | 52.00 |
| MDI PF (2nd isocyanate) | — | — | 24.40 | — | — | 24.40 |
| MDI CD (1st isocyanate) | 65.00 | 56.26 | — | 51.67 | 59.42 | — |
| MDI MLQ (2nd isocyanate) | 8.33 | 11.40 | — | 25.80 | 18.65 | — |
| CO-1 | 26.50 | — | 12.32 | — | — | 12.32 |
| PEP-450 | — | — | — | — | 11.89 | — |
| POLY G 20-56 | — | — | 11.26 | — | — | 11.26 |
| R20LM | — | 32.32 | — | 22.51 | — | — |
| DOA | — | — | — | — | 10.00 | — |
| BC | 0.02 | — | — | — | 0.02 | — |
| SF-8843 | — | 0.02 | 0.02 | 0.02 | 0.02 | 0.02 |
| UV-5411 | 0.10 | — | — | — | — | — |
| MFP | — | — | — | — | — | — |
| ACP-1400 | 0.05 | — | — | — | — | — |
| Total Part A | 100.00 | 100.00 | 100.00 | 100.00 | 100.00 | 100.00 |
| In-process NCO target | 15.9-16.1 | 15.9-16.1 | 12.9-13.1 | 18.0-18.15 | 15.0-15.15 | 12.9-13.1 |
| Final NCO | 18.00 | 18.00 | 15.10 | 22.15 | 18.00 | 15.10 |
| Unreacted Isocyanate in A | 49.4 | 52.3 | 58.0 | 67.0 | 37.2 | 58.0 |
| Part B | | | | | | |
| CO-1 | — | — | 41.93 | — | — | 41.93 |
| CO-2 | 46.05 | 46.05 | — | 48.40 | 45.30 | — |
| PEP-450 | — | — | 26.00 | — | — | 26.00 |

TABLE 3-continued

Adhesive Compositions - Examples 1-9 and Comparative Examples 1-2

| | | | | | | |
|---|---|---|---|---|---|---|
| POLY G 20-56 | — | — | — | — | — | — |
| POLY G 76-635 | 18.62 | 18.62 | — | 25.50 | 18.62 | — |
| QUAD | — | — | — | — | — | — |
| 3A/5A | 0.75 | 0.75 | 2.00 | 0.75 | 0.75 | 2.00 |
| DOA | 28.48 | 29.98 | 25.97 | 20.78 | 30.73 | 25.97 |
| MFP | 0.04 | 0.04 | 0.04 | 0.04 | 0.04 | 0.04 |
| UL-28 | 0.06 | 0.06 | 0.06 | 0.03 | 0.06 | 0.06 |
| SiO$_2$ | 4.50 | 4.50 | 4.00 | 4.50 | 4.50 | 4.00 |
| D230 | 1.50 | — | — | — | — | — |
| Total Part B | 100.00 | 100.00 | 100.00 | 100.00 | 100.00 | 100.00 |
| Mix Ratio (A:B by weight) | 100:87.5 | 100:89.8 | 100:87.51 | 100:90 | 100:89.62 | 100:87.51 |
| Equivalents Active Hydrogen (%)$^a$ | 95.0 | 95.0 | 93.3 | 94.4 | 95.0 | 93.3 |
| Isocyanate Index$^a$ | 1.05 | 1.05 | 1.07 | 1.06 | 1/05 | 1.07 |
| Equivalents Active Hydrogen (%)$^b$ | 94.5 | 92.7 | 93.7 | 96.3 | 95.4 | 93.7 |
| Isocyanate Index$^b$ | 1.06 | 1.08 | 1.07 | 1.04 | 1.05 | 1.07 |
| Plasticizer in A + B | 13.3 | 14.2 | 12.1 | 9.8 | 19.8 | 12.1 |

| | Relative Amount (wt %) | | | | |
|---|---|---|---|---|---|
| Component | Ex. 7 | Ex. 8 | Ex. 9 | C. Ex. 1 | C. Ex. 2 |
| Part A | | | | | |
| MDI PF (1st isocyanate) | 65.77 | 52.00 | 52.00 | — | — |
| MDI PF (2nd isocyanate) | 14.15 | 24.40 | 24.40 | — | — |
| MDI CD (1st isocyanate) | — | — | — | 69.64 | 62.85 |
| MDI MLQ (2nd isocyanate) | — | — | — | — | 38.10 |
| CO-1 | 10.48 | 12.32 | 12.32 | — | — |
| POLY G 20-56 | 9.58 | 11.26 | 11.26 | — | — |
| R20LM | — | — | — | 30.34 | — |
| DOA | — | — | — | — | — |
| BC | — | — | — | — | — |
| SF-8843 | 0.02 | 0.02 | 0.02 | 0.02 | 0.02 |
| UV-5411 | — | — | — | — | 0.27 |
| MFP | — | — | — | — | 0.05 |
| ACP-1400 | — | — | — | — | — |
| Total Part A | 100.00 | 100.00 | 100.00 | 100.00 | 101.29 |
| In-process NCO | 12.9-13.1 | 12.9-13.1 | 12.9-13.1 | | |
| Final NCO | 16.00 | 15.10 | 15.00 | 18.00 | 14.00 |
| Unreacted Isocyanate in A | 63.0 | 60.0 | 57.4 | 54.1 | 42.2 |
| Part B | | | | | |
| CO-1 | 38.11 | 43.92 | 43.93 | 0.75 | 38.11 |
| CO-2 | 57.92 | — | — | 45.30 | 57.92 |
| PEP-450 | — | 20.00 | 18.00 | — | — |
| POLY G 20-56 | — | — | 28.00 | — | — |
| POLY G 76-635 | — | — | — | 18.62 | — |
| QUAD | — | 4.00 | 4.00 | — | — |
| 3A/5A | — | 2.00 | 2.00 | 0.75 | — |
| DOA | — | 26.00 | — | 29.98 | — |
| MFP | — | 0.04 | 0.04 | 0.04 | — |
| UL-28 | 0.05 | 0.04 | 0.04 | 0.04 | — |
| SiO$_2$ | 3.92 | 4.00 | 4.00 | 4.50 | 3.97 |
| D230 | — | — | — | — | — |
| Total Part B | 100.00 | 100.00 | 100.00 | 100.00 | 100.00 |
| Mix Ratio (A:B by weight) | 100:89.21 | 100:89.25 | 100:87.42 | 100:90 | 100:75 |
| Equiv. Active Hydrogen (%)$^a$ | 95.0 | 95.3 | 96.0 | 94.8 | 91.4 |
| Isocyanate Index$^a$ | 1.05 | 1.05 | 1.04 | 1.05 | 1.09 |
| Equiv. Active Hydrogen (%)$^b$ | 94.7 | 93.9 | 94.6 | 94.1 | 110.1 |
| Isocyanate Index$^b$ | 1.06 | 1.06 | 1.06 | 1.06 | 0.91 |
| Plasticizer in A + B | 0 | 12.3 | 0 | 14.2 | 0 |

$^a$With specified weight ratio of A:B.
$^b$With 1:1 volume ratio of A:B.

TABLE 4

Physical Properties - Examples 1-9 and Comparative Examples 1-2

| Physical Property[a] | Ex. 1 | Ex. 2 | Ex. 3 | Ex. 4 | Ex. 5 | Ex. 6 |
|---|---|---|---|---|---|---|
| Viscosity of (A), 25° C. (cP) | 3,340 | 3,000 | 20,000 | 500 | 25,000 | 20,000 |
| Viscosity of (B), 25° C. (cP) | 37,000 | 41,000 | 70,000 | 60,000 | 50,000 | 45,000 |
| Initial mix visc., 25° C. (cP) | 14,500 | 8,500 | 33,000 | 7,000 | 28,000 | 16,000 |
| Work life, 25° C. (min.) | 30 | 25 | 45 | 35 | 35 | 45 |
| Shore Hardness | 55D | 53D | 55D | 65D | 68D | 57D |
| Tensile strength (psi) | 2,457 | 2,281 | 2,063 | 3,300 | — | 2,000 |
| Elongation (%) | 92 | 86 | 89 | 48 | — | 90 |
| Tear Strength (pli) | 189 | 195 | 211 | 545 | — | 200 |
| NaOH Resistance[b] | 19 (loss) | 8.65 (loss) | 6.10 (loss) | 6.47 (loss) | 6.57 (loss) | 6.49 (loss) |

[a] cP = centipoise, min. = minutes, psi = pounds per square inch, pli = pounds per linear inch.
[b] (wt. %) Exposure to 2 wt. % NaOH at 72° C. for 1000 hrs. (wt. %).

| Physical Property[a] | Ex. 7 | Ex. 8 | Ex. 9 | C. Ex. 1 | C. Ex. 2 |
|---|---|---|---|---|---|
| Viscosity of (A), 25° C. (cP) | 22,000 | 20,000 | 20,000 | 3,400 | 15,000 |
| Viscosity of (B), 25° C. (cP) | 30,000 | 24,000 | 30,000 | 59,000 | 20,000 |
| Initial mix visc., 25° C. (cP) | 20,000 | 10,000 | 12,000 | 10,000 | 16,000 |
| Work life, 25° C. (min.) | 15 | 25 | 20 | 18-22 | 48 |
| Shore Hardness | 67D | 52D | 62D | 55D | 65D |
| Tensile strength (psi) | 3,257 | 2,552 | 2,847 | 2,664 | 2,900 |
| Elongation (%) | 104 | 85 | 60 | 67 | 110 |
| Tear Strength (pli) | 673 | 221 | 550 | 364 | 250 |
| NaOH Resistance[b] | — | 0.98 (loss) | 0.36 (loss) | 5.71 (loss) | 9.81 (loss) |

[a] cP = centipoise, min. = minutes, psi = pounds per square inch, pli = pounds per linear inch.
[b] Exposure to 2 wt. % NaOH at 72° C. for 1000 hrs. (wt. %).

Examples 10-13: Aliphatic Polyisocyanate

General procedures for the preparation of prepolymer (Parts A), Parts B, and for mixing Parts A and B are described above. The adhesive compositions are summarized in Table 5, and physical properties of parts A and B, and the polyurethane adhesives obtained by mixing and curing Parts A and B, are summarized in Table 3.

TABLE 5

Adhesive Compositions - Examples 10-13

| | Relative Amount (wt %) | | | |
|---|---|---|---|---|
| Component | Ex. 10 | Ex. 11 | Ex. 12 | Ex. 13 |
| Part A | | | | |
| MDI PF (1st isocyanate) | 59.68 | 55.80 | 50.96 | 50.97 |
| MDI PF (2nd isocyanate) | — | 14.79 | 23.92 | 23.91 |
| E₁₂MDI (2nd isocyanate) | 12.57 | 3.47 | 2.00 | — |
| TMXDI (2nd isocyanate) | — | — | — | 2.00 |
| CO-1 | 14.49 | 13.54 | 12.07 | 12.07 |
| POLY G 20-56 | 13.24 | 12.38 | 11.03 | 11.03 |
| SF-8843 | 0.02 | 0.02 | 0.02 | 0.02 |
| Total Part A | 100.00 | 100.00 | 100.00 | 100.00 |
| In-process NCO target | 12.9-13.1 | 12.9-13.1 | 12.9-13.1 | 12.9-13.1 |
| Final NCO target | 15.10 | 15.10 | 15.10 | 15.10 |
| Unreacted Isocyanate in Part A | 52.9 | 56.6 | 57.2 | 59.1 |
| Part B | | | | |
| CO-1 | 43.92 | 43.92 | 43.92 | 43.92 |
| CO-2 | — | — | — | — |
| PEP-450 | 20.00 | 20.00 | 20.00 | 20.00 |
| POLY G 20-56 | — | — | 28.00 | — |
| QUAD | 4.00 | 4.00 | 4.00 | 4.00 |
| 3A/5A | 2.00 | 2.00 | 2.00 | 2.00 |
| DOA | 26.00 | 26.00 | 26.00 | 26.00 |
| MFP | 0.04 | 0.04 | 0.04 | 0.04 |
| UL-28 | 0.04 | 0.04 | 0.04 | 0.04 |
| SiO₂ | 4.00 | 4.00 | 4.00 | 4.00 |
| Total Part | 100.00 | 100.00 | 100.00 | 100.00 |
| Mix Ratio (A:B by weight) | 100:89.47 | 100:89.00 | 100:89.50 | 100:91.31 |
| Equiv. Active Hydrogen (%)[a] | 95.5 | 95.0 | 95.6 | 97.5 |

TABLE 5-continued

Adhesive Compositions - Examples 10-13

| | Relative Amount (wt %) | | | |
|---|---|---|---|---|
| Component | Ex. 10 | Ex. 11 | Ex. 12 | Ex. 13 |
| Isocyanate Index[a] | 1.05 | 1.05 | 1.05 | 1.03 |
| Equiv. Active Hydrogen (%)[b] | 95.5 | 95.5 | 95.5 | 95.6 |
| Isocyanate Index[b] | 1.05 | 1.05 | 1.05 | 1.05 |
| Plasticizer in A + B | 12.3 | 12.2 | 12.3 | 12.4 |

[a]With specified weight ratio of A:B.
[b]With 1:1 volume ratio of A:B

TABLE 6

Physical Properties - Examples 10-13

| Physical Property[a] | Ex. 10 | Ex. 11 | Ex. 12 | Ex. 13 |
|---|---|---|---|---|
| Viscosity of (A), 25° C. (cP) | 25,000 | 27,000 | 25,200 | 22,500 |
| Viscosity of (B), 25° C. (cP) | 24,000 | 24,000 | 24,000 | 24,000 |
| Initial mix visc., 25° C. (cP) | 12,500 | 12,000 | 12,000 | 12,000 |
| Work life, 25° C. (min.) | 25 | 25 | 25 | 25 |
| Shore Hardness | 52D | 52D | 52D | 52D |
| Tensile strength (psi) | 2,500 | 2,500 | 2,500 | 2,500 |
| Elongation (%) | 85 | 85 | 85 | 85 |
| Tear Strength (pli) | 220 | 220 | 220 | 220 |
| NaOH Resistance[b] | 0.73 (gain) | 1.29 (loss) | 0.56 (loss) | 1.31 (gain) |

[a]cP = centipoise, min. = minutes, psi = pounds per square inch, pli = pounds per linear inch.
[b]Exposure to 2 wt. % NaOH at 72° C. for 1000 hrs. (wt. %).

Example 14

Visualization of Penetration of Adhesive Composition

Reverse osmosis membranes comprising a semipermeable membrane and a porous backing comprising a non-woven scrim layer and a porous thermoplastic polymer layer (AG LF Series reverse osmosis membranes, available from GE Water & Process Technologies, Trevose, Pa., USA) were used in this evaluation. A bead of the adhesive composition of Example (Ex.) 4 was applied to the porous backing using a side-by-side cartridge and was allowed to cure for 24 hours at room temperature. After 24 hours, the reverse osmosis membrane was evaluated to determine the level of adhesive penetration though the porous backing. Penetration of the adhesive composition was rated "None" to "Excellent" by visual evaluation of the percent of the area in which the adhesive composition penetrated the porous backing to the semipermeable membrane layer as indicated in Table 7.

TABLE 7

Visual Penetration of Adhesive Compositions in Reverse Osmosis Membranes

| Rating | Visual Penetration of Adhesive Composition through Porous Backing to Semipermeable Membrane (Area Percent) |
|---|---|
| None | 0 |
| Poor | Less than 25 |
| Fair | 25-50 |
| Good | 50-90 |
| Excellent | More than 90 |

Figure 2:
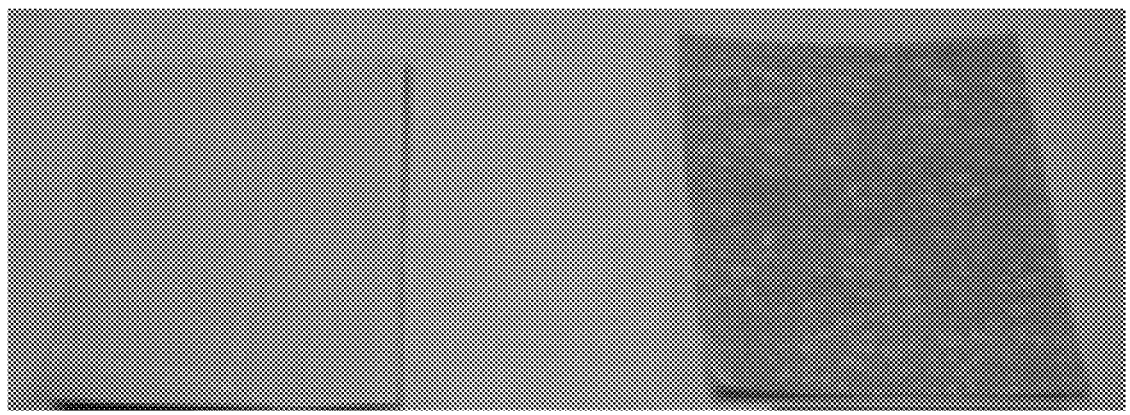
FIG. 2 is a photograph of reverse osmosis membranes treated with an inventive adhesive composition having a second isocyanate (right) and with a comparative adhesive composition without a second isocyanate (left).

FIG. 2 is a photograph of reverse osmosis membranes treated with an inventive adhesive composition having a second isocyanate (right) and with a comparative adhesive composition without a second isocyanate (left). As can be seen from FIG. 2, the inventive adhesive composition having a second isocyanate shows good penetration (darkened areas), with 50 to 90% of the adhesive composition penetrating the porous backing. In contrast, the comparative adhesive composition failed to penetrate the porous backing, as indicated by the absence of darkened areas on the semipermeable membrane surface.

Figure 3:
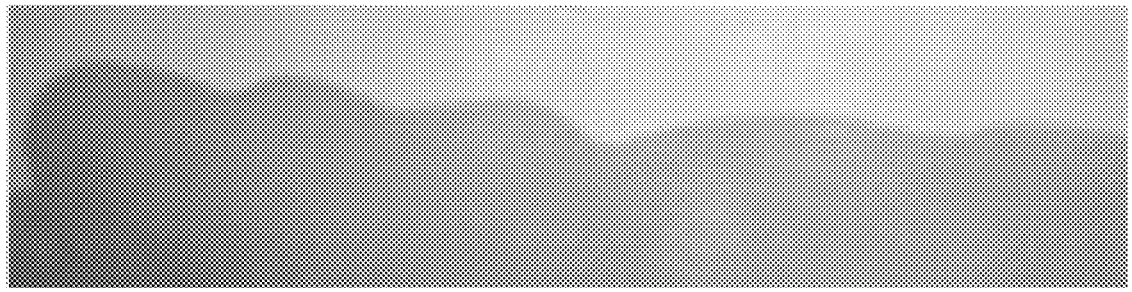
FIG. 3 is a photograph of another reverse osmosis membrane treated with an inventive adhesive composition having a second isocyanate.

FIG. 3 is a photograph of another reverse osmosis membrane treated with an inventive adhesive composition having a second isocyanate. As can be seen from FIG. 3, the inventive adhesive composition having a second isocyanate shows excellent penetration of the porous backing. The area treated with the inventive adhesive composition (darkened) shows greater than 90 area percent penetration.

Example 15

Determination of Tendency to Produce Osmotic Blisters with Reverse Osmosis Membranes Not only do the inventive adhesive compositions exhibit good to excellent penetration of the porous backing or reverse osmosis membranes, as illustrated in Ex. 14, they can also eliminate osmotic blistering. Evaluations were done as follows. An 8×8 inch sample was cut from a commercial reverse osmosis membrane comprising a non-woven scrim layer, a porous thermoplastic polymer layer, and a thin semi-permeable layer (AG LF Series reverse osmosis membranes, available from GE Water & Process Technologies, Trevose, Pa., USA). An 8×4 inch sample was cut from commercial permeate spacer sheet. The reverse osmosis membrane sample was folded in half, so that the semipermeable layer was on the outside and the non-woven scrim layer was on the inside. The permeate spacer sample was placed inside the folded membrane. A sample of adhesive composition was prepared using a static mixer. A bead of freshly mixed adhesive sufficient to create a 1×4 inch area of adhesive once compressed was applied to the permeate spacer, and the folded membrane was closed. A pane of glass was placed over the envelope resting on a lab bench and compressed to create a uniform adhesive thickness. The adhesive was allowed to cure at 25° C. for 2-3 days. The effect of adhesive composition on blistering was evaluated by alternating soaking of the reverse osmosis membranes in deionized water and a saturated sea salt solution as indicated in Table 8.

TABLE 8

Exposure Protocol for Osmotic Blistering Testing

| Day | Exposure |
|---|---|
| 1 | Sea salt water for 24 hours. |
| 2 | Deionized water for 24 hours. |
| 3 | Sea salt water for 24 hours. |
| 4 | Deionized water for 24 hours. |
| 5 | Sea salt water for 72 hours. |
| 8 | Deionized water for 2 hours. |

The samples were evaluated after 2 hours into the deionized water soaks on days 2, 4, and 8. The degree of blistering was rated by counting the number of blisters in a 1×4 inch section of the membrane surface corresponding to the area containing the compressed adhesive. The results are summarized in Table 9. As can be seen from Table 8, each of inventive Ex. 1-4 and 6-8, with no blistering after 11 days, far out-performed Comparative Examples (C. Ex.) 1 and 2, with greater than 25 and 12 blisters, respectively.

TABLE 9

Osmotic Blistering Test Results

| Polyurethane Adhesive | Blister Count | | |
|---|---|---|---|
| | Day 2 | Day 4 | Day 8 |
| C. Ex. 1 | 3 | 10 | >25 |
| C. Ex. 2 | 0 | 5 | 12 |
| Ex. 1 | 0 | 0 | 0 |
| Ex. 2 | 0 | 0 | 0 |
| Ex. 3 | 0 | 0 | 0 |
| Ex. 4 | 0 | 0 | 0 |
| Ex. 6 | 0 | 0 | 0 |
| Ex. 7 | 0 | 0 | 0 |
| Ex. 8 | 0 | 0 | 0 |

Figure 4:
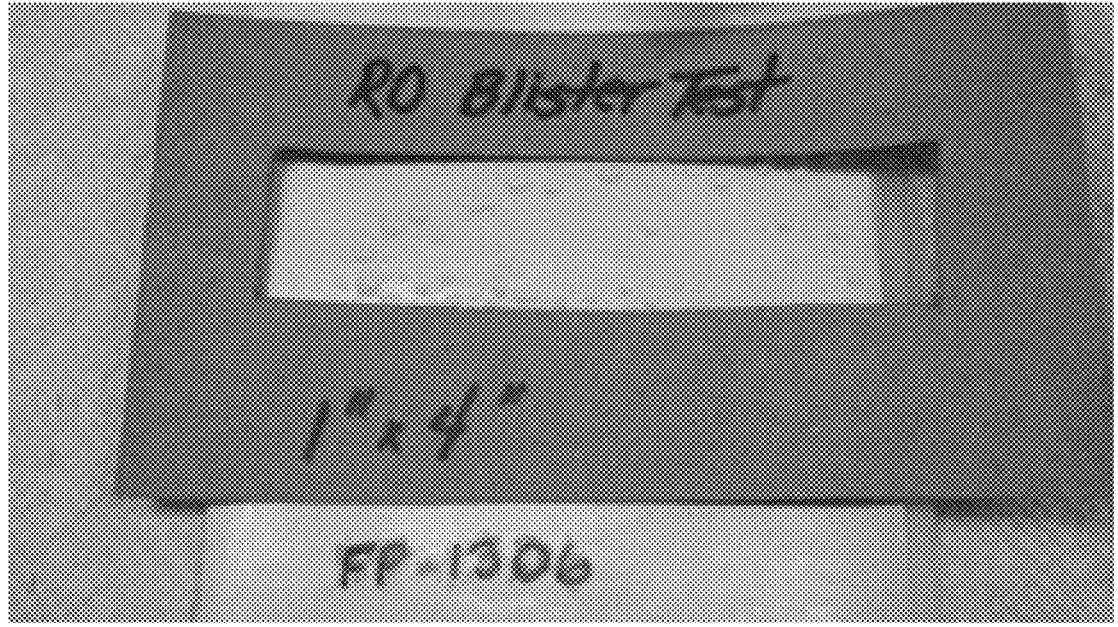
FIG. 4 is a photograph of the test area of a reverse osmosis membrane bonded with the polyurethane adhesive of Comparative Example 1 after 8 days of testing for osmotic blistering.
Figure 5:
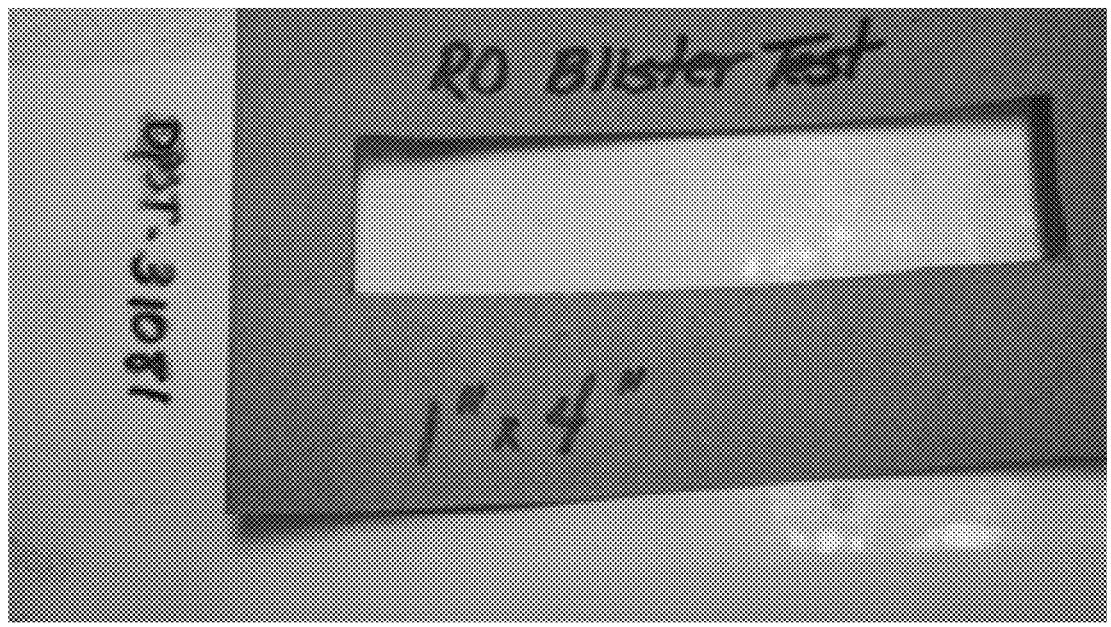
FIG. 5 is a photograph of the test area of a reverse osmosis membrane bonded with the polyurethane adhesive of Comparative Example 2 after 8 days of testing for osmotic blistering.
Figure 6:
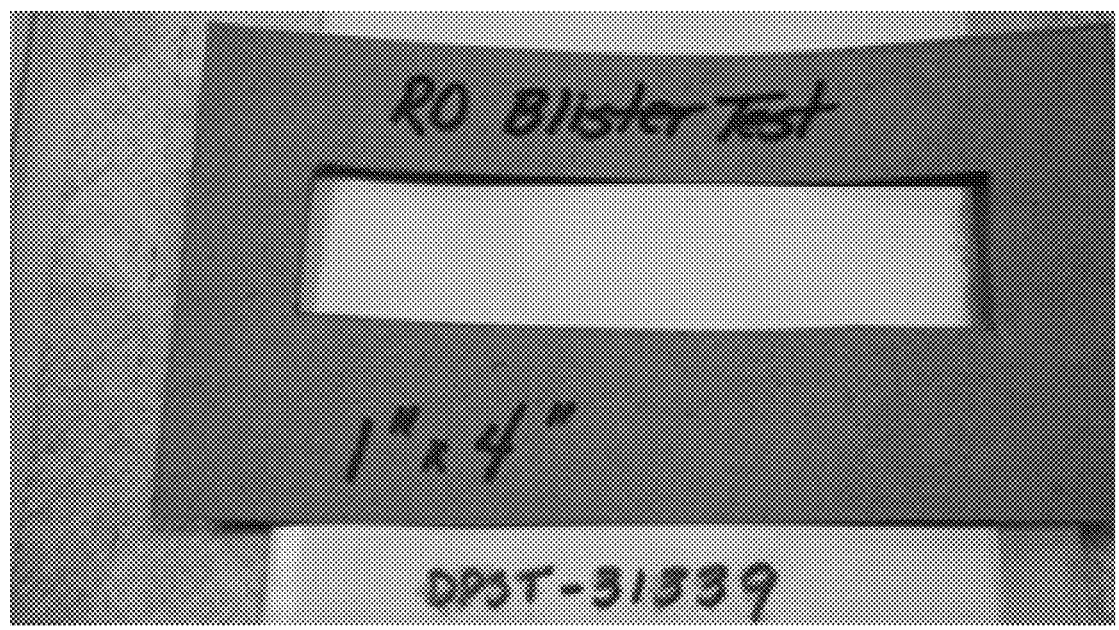
FIG. 6 is a photograph of the test area of a reverse osmosis membrane bonded with the polyurethane adhesive of Example 1 after 8 days of testing for osmotic blistering.
Figure 7:
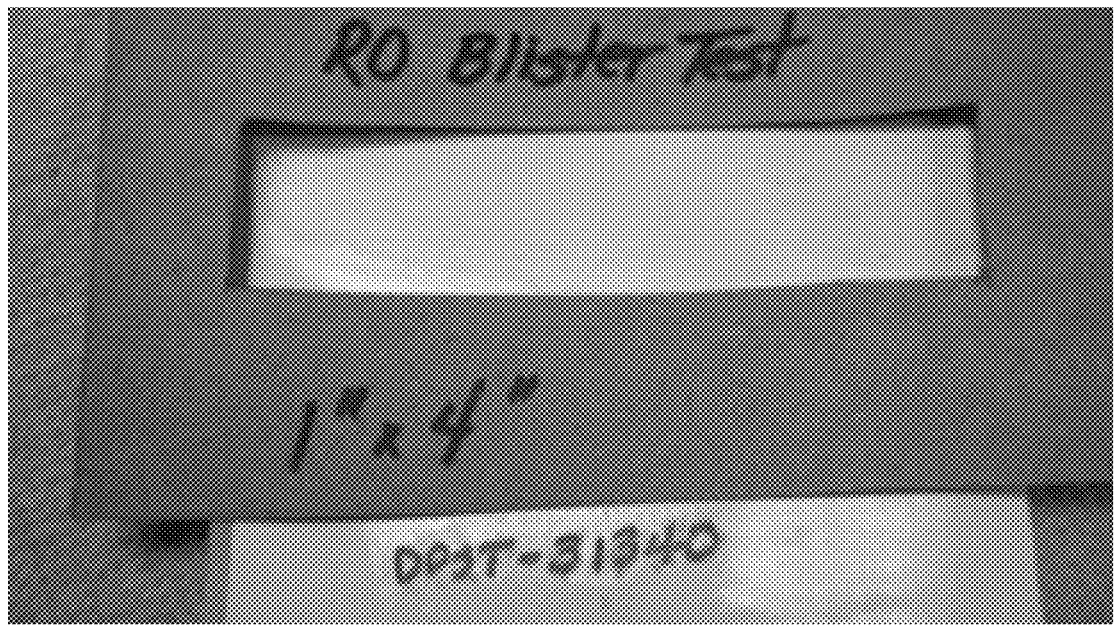
FIG. 7 is a photograph of the test area of a reverse osmosis membrane bonded with the polyurethane adhesive of Example 2 after 8 days of testing for osmotic blistering.
Figure 8:
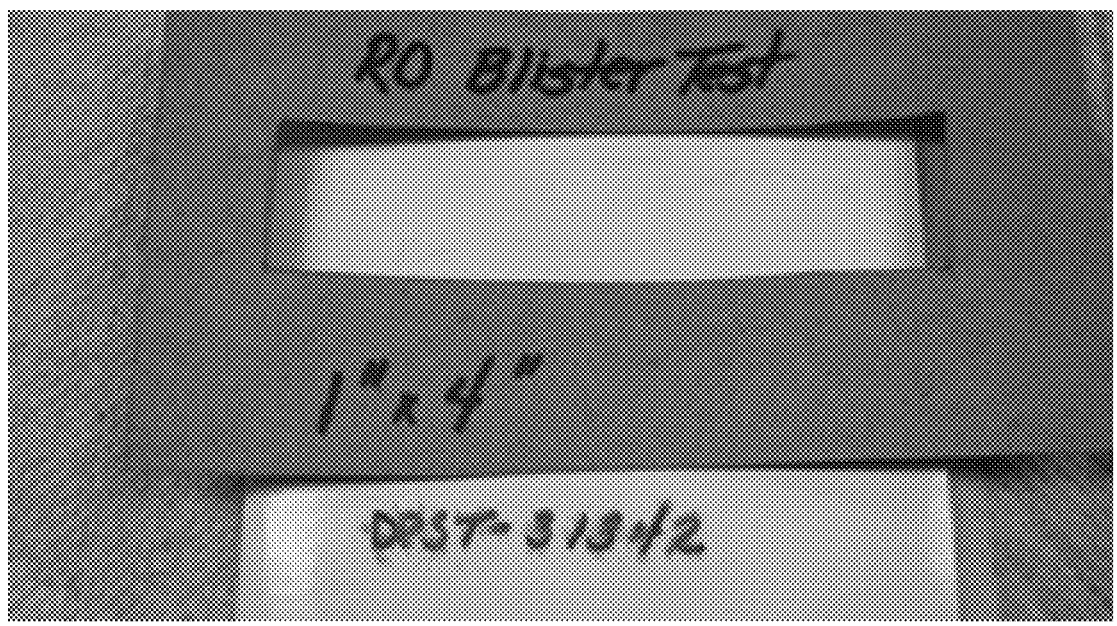
FIG. 8 is a photograph of the test area of a reverse osmosis membrane bonded with the polyurethane adhesive of Example 3 after 8 days of testing for osmotic blistering.
Figure 9:
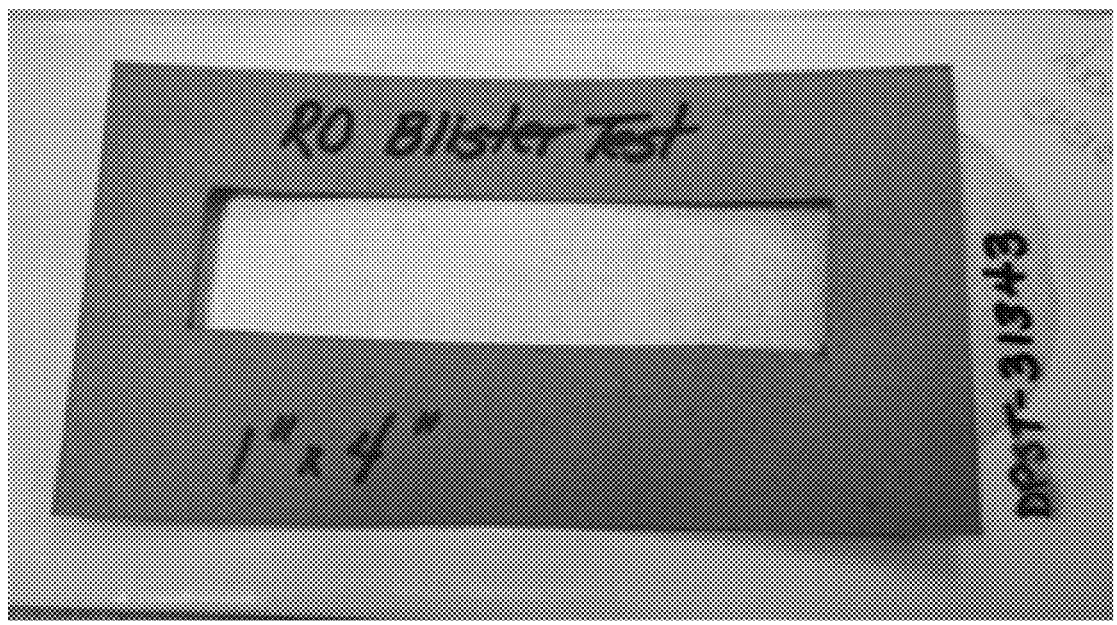
FIG. 9 is a photograph of the test area of a reverse osmosis membrane bonded with the polyurethane adhesive of Example 4 after 8 days of testing for osmotic blistering.
Figure 10:
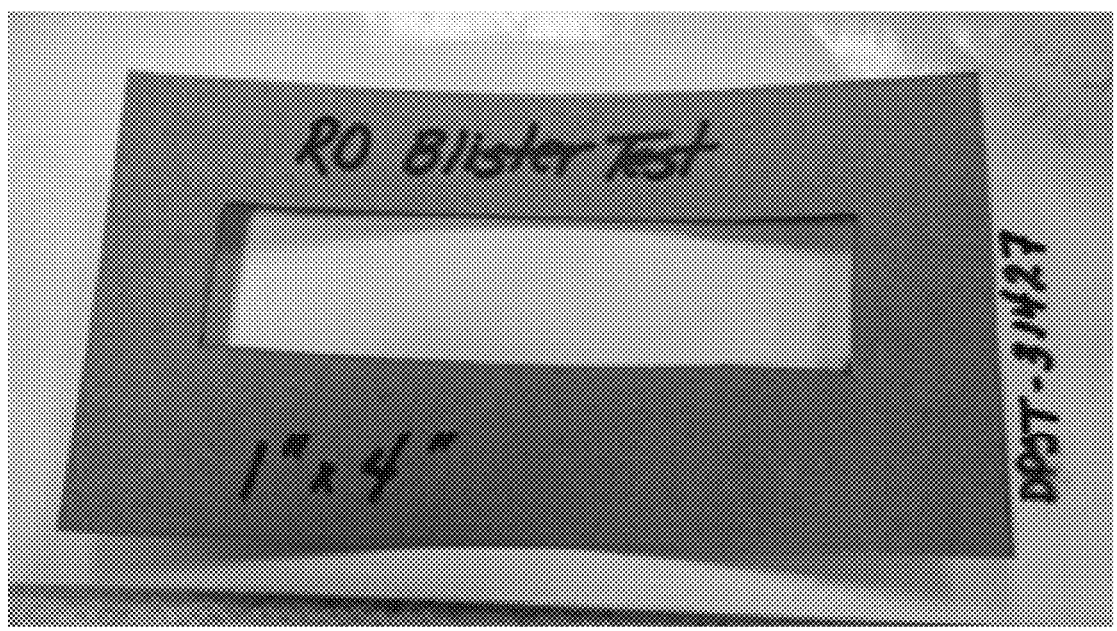
FIG. 10 is a photograph of the test area of a reverse osmosis membrane bonded with the polyurethane adhesive of Example 6 after 8 days of testing for osmotic blistering.
Figure 11:
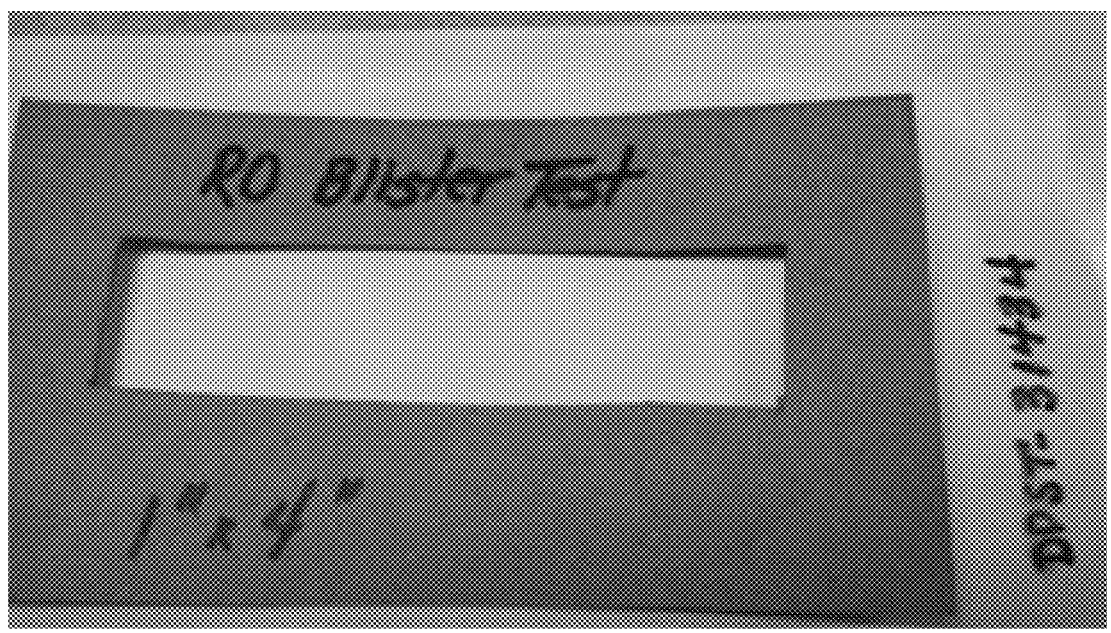
FIG. 11 is a photograph of the test area of a reverse osmosis membrane bonded with the polyurethane adhesive of Example 7 after 8 days of testing for osmotic blistering.
Figure 12:
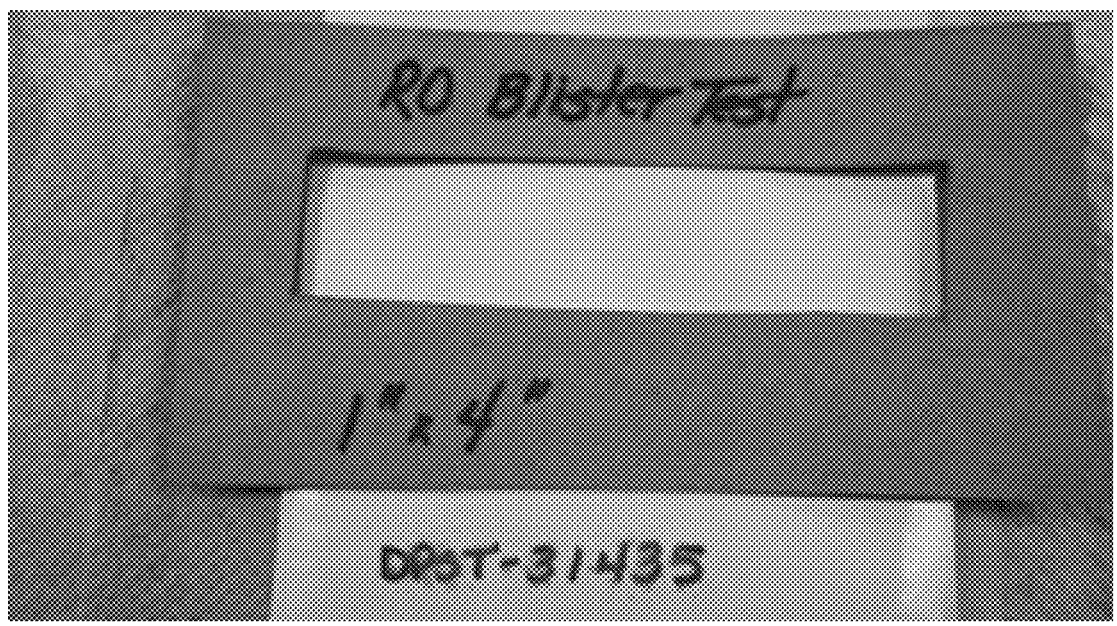
FIG. 12 is a photograph of the test area of a reverse osmosis membrane bonded with the polyurethane adhesive of Example 8 after 8 days of testing for osmotic blistering.

Photographs of the test area for the reverse osmosis membranes bonded with the adhesive compositions of C. Ex. 1 and 2 and Ex. 1-4 and 6-8 after Day 8 are provided in FIG. 4-12, respectively. The osmotic blisters of C. Ex. 1 and 2 can be seen in FIGS. 4 and 5, respectively. The absence of osmotic blisters in Ex. 1-4 and 6-8 can be seen in FIG. 6-12, respectively.

Example 15

Extractable Aromatic Amine Content of Polyurethane Adhesives

Extractable aromatic amine content was measured by sequentially contacting the polyurethane adhesive with 50 wt. % aqueous ethanol for 2 hours at 70° C. The results are summarized in Table 10. The results are expressed as micrograms (μg) of aromatic amine per 10 centimeters (cm) of polyurethane adhesive.

TABLE 10

Extractable Aromatic Amine Test Results

| Polyurethane Adhesive | 1st Contact (μg/10 cm) | 2nd Contact (μg/10 cm) | 3rd Contact (μg/10 cm) |
|---|---|---|---|
| Commercial adhesive | 15.1 | 6.4 | 3.2 |
| Commercial adhesive | 12.8 | 7.2 | 3.4 |
| Ex. 8 | 12.5 | 3.5 | 4.0 |
| Ex. 10 | 2.7 | 1.7 | 0.5 |
| Ex. 12 | 1.2 | 0.9 | 0.3 |

In Ex. 8, the first and second isocyanates are both a prepolymer of 4,4'-diphenylmethane diisocyanate containing 50-60 wt % 4,4'-diphenylmethane diisocyanate, 40-50 wt % prepolymer (dipropylene glycol, polymer with 4,4'-diphenylmethane diisocyanate), and 1-10 wt % diphenylmethane diisocyanate mixed isomers. In Ex. 10, all of the second isocyanate was replaced with 4,4'-dicyclohexylmethane diisocyanate, and in Ex. 12, a portion of the second isocyanate was replaced with 4,4'-dicyclohexylmethane diisocyanate. As can be seen from Ex. 8, 10, and replacement of all or a portion of aromatic isocyanate in the second isocyanate results in significantly reduced extractable aromatic amine. It was surprising that extractable aromatic amine could be reduced without replacing all of the aromatic isocyanate in Ex. 8.

Various patent and/or scientific literature references have been referred to throughout this application. The disclosures of these publications in their entireties are hereby incorporated by reference as if written herein. In view of the above description and the examples, one of ordinary skill in the art will be able to practice the disclosure as claimed without undue experimentation.

The term, "aromatic isocyanate" refers to an isocyanate in which the isocyanate group is bonded directly to an aromatic ring, for example a substituted or unsubstituted benzene ring or a substituted or unsubstituted naphthalene ring.

The term, "aliphatic isocyanate" refers to an isocyanate in which the isocyanate group is bonded directly to an aliphatic carbon atom.

The term, "polyol" refers to an organic compound having two or more hydroxyl groups. The polyol can be, for example, a diol, a triol, or a tetrol.

The presence of a slash ("/") in a chemical name indicates a mixture of isomeric compounds. For example, "di($C_9$-linear/branched alkyl) phthalate" refers to a mixture of di($_{C9}$-linear alkyl) phthalate and di($C_9$-branched alkyl) phthalate.

As used herein, the terms "a" and "an" do not denote a limitation of quantity, but rather the presence of at least one of the referenced items. "Or" means "and/or" unless clearly indicated to the contrary by context. Recitation of ranges of values are merely intended to serve as a shorthand method of referring individually to each separate value falling within the range, and each separate value is incorporated into this specification as if it were individually recited. Thus each range disclosed herein constitutes a disclosure of any sub-range falling within the disclosed range. Disclosure of a narrower range or more specific group in addition to a broader range or larger group is not a disclaimer of the broader range or larger group. All ranges disclosed herein are inclusive of the endpoints, and the endpoints are independently combinable with each other. "Comprises" as used herein includes embodiments "consisting essentially of" or "consisting of" the listed elements.

Although the foregoing description has shown, described, and pointed out the fundamental novel features of the typical embodiments of the invention, it will be understood that various omissions, substitutions, and changes may be made by those skilled in the art, without departing from the scope of the present teachings.

What is claimed is:
1. An adhesive composition comprising:
   a first part comprising:
   an isocyanate group-containing prepolymer comprising a reaction product of a first isocyanate and at least one polyol; and a second isocyanate that is essentially unreacted with the first isocyanate, the at least one polyol, and the isocyanate group containing prepolymer, wherein said second isocyanate may be the same or different than the first isocyanate;

a second part comprising at least two polyols; and from 0.5 to 35 weight percent of a plasticizer, based on the total weight of the adhesive composition, wherein the plasticizer is selected from the group consisting of dicarboxylate esters, tricarboxylate esters, benzoates, dibenzoates, epoxidized vegetable oils, esters of soybean oils, phthalates, phosphate esters and combinations of thereof;

wherein the adhesive composition is essentially free of diluent oils and solvents, wherein the first part of the composition has a total NCO content of 10 to 35 weight percent, based on the total weight of the first part, as measured in accordance with ASTM D2572.

2. The adhesive composition of claim 1, wherein the second isocyanate is the same as the first isocyanate.

3. The adhesive composition of claim 1, wherein polybutadiene diols and polyisobutylene diols are absent from the first part.

4. The adhesive composition of claim 1, wherein the first isocyanate and the second isocyanate are independently 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate and cyclohexane-1,4-diisocyanate, 1-isocyanato-2-isocyanatomethyl cyclopentane, 1-isocyanato-3-isocyanatomethyl-3,5,5-trimethyl-cyclohexane, 4,4'-dicyclohexylmethane diisocyanate, 2,4'-dicyclohexylmethane diisocyanate, 1,3-bis(cyclohexyl) diisocyanate, 1,4-bis-(isocyanatomethyl)-cyclohexane, bis (4-isocyanato-3-methyl-cyclohexyl)methane, 1-isocyanato-1-methyl-4(3)-isocyanatomethyl cyclohexane, alpha,alpha,alpha',alpha'-tetramethyl-1,3-xylylene diisocyanate, alpha,alpha,alpha',alpha'-tetramethyl-1,4-xylylene diisocyanate, 2,4-hexahydrotoluene diisocyanate, 2,6-hexahydrotoluene diisocyanate, 1,3-phenylene diisocyanate, 1,4-phenylene diisocyanate, 2,4-toluene diisocyanate, 2,6-toluene diisocyanate, 2,4-diphenylmethane diisocyanate, 1,5-diisocyanato naphthalene, 4,4'-diphenylmethane diisocyanate, a chemical modification of at least one of the foregoing isocyanates, a prepolymer derived from reaction of at least one of the foregoing isocyanates with a diol or a diamine, or combinations comprising at least one of the foregoing isocyanates.

5. The adhesive composition of claim 1, wherein the first isocyanate and second isocyanate are independently monomeric diphenylmethane diisocyanate, a modified diphenylmethane diisocyanate having an average of greater than 2 and less than or equal to 4 isocyanate groups per molecule, or a combination comprising at least one of the foregoing isocyanates.

6. The adhesive composition of claim 1, wherein the first isocyanate and second isocyanate are independently a modified diphenylmethane diisocyanate selected from a carbodiimide-modified diphenylmethane diisocyanate, a prepolymer derived from reaction of diphenylmethane diisocyanate with a diol or diamine, or a combination comprising at least one of the foregoing isocyanates.

7. The adhesive composition of claim 1, wherein the at least two polyols of the second part comprise castor oil, a castor oil derivative, an ester of ricinoleic acid, a polyether polyol, a polyol derived from natural oils, a polyol derived from fats, a polyether polyol, a polylactone, a polyester polyol, a polybutadiene polyol, a polyisobutylene diol, a polyol having amine functionality, or a combination comprising at least one of the foregoing polyols.

8. The adhesive composition of claim 1, wherein the at least two polyols of the second part comprise a polyether polyol, castor oil, a castor oil derivative, an ester of ricinoleic acid, a polyol having amine functionality, or combinations comprising at least two of the foregoing polyols.

9. The adhesive composition of claim 1, wherein the at least one polyol of the first part comprises castor oil, a castor oil derivative, an ester of ricinoleic acid, a polyether polyol, a polyol derived from natural oil, a polyol derived from fats, a polyether polyol, a polylactone, a polyester polyol, a polybutadiene polyol, a polyisobutylene diol, a polyol having amine functionality, or a combination comprising at least one of the foregoing polyols.

10. The adhesive composition of claim 1, wherein the at least one polyol of the first part comprises castor oil, a castor oil derivative, an ester of ricinoleic acid, a polyether polyol, a polybutadiene polyol, a polyisobutylene diol, or a combination comprising at least one of the foregoing polyols.

11. The adhesive composition of claim 8, wherein the at least one polyol of the first part consists of castor oil or a castor oil derivative.

12. The adhesive composition of claim 8, wherein the at least one polyol of the first part comprises castor oil or a castor oil derivative, and a polyether diol.

13. The adhesive composition of claim 8, wherein the at least one polyol of the first part consists of a tetrol.

14. The adhesive composition of claim 8, wherein the at least one polyol of the first part consists of polybutadiene polyol.

15. The adhesive composition of claim 10, wherein the at least two polyols of the second part comprise castor oil, a castor oil derivative, an ester of ricinoleic acid, a polyol derived from natural oils, a polyether polyol, or a combination comprising at least two of the foregoing polyols.

16. The adhesive composition of claim 10, wherein the at least two polyols of the second part comprise a transesterification product of castor oil with pentaerythritol, and a polyether triol.

17. The adhesive composition of claim 10, wherein the at least two polyols of the second part comprise castor oil, a transesterification product of castor oil with pentaerythritol, a polyol derived from natural oils, a polyether tetrol, or a combination comprising at least one of the foregoing polyols.

18. The adhesive composition of claim 10, wherein the at least two polyols of the second part comprise castor oil, a polyether tetrol, a polyol having amine functionality, or a combination comprising at least two of the foregoing polyols.

19. The adhesive composition of claim 1, wherein the first isocyanate comprises an aromatic isocyanate and the second isocyanate comprises an aliphatic isocyanate.

20. The adhesive composition of claim 1, wherein the first isocyanate comprises an aromatic isocyanate and the second isocyanate comprises 1 to 50 weight percent aliphatic isocyanate and 49 to 50 weight percent of aromatic isocyanate, based on the total weight of the second isocyanate.

21. The adhesive composition of claim 1, further comprising a desiccant.

22. A polyurethane adhesive made by mixing the first part and the second part of the adhesive composition of claim 1 in a 1:1 to 1.2:1 weight ratio of the first part to the second part to form a mixture, and curing the mixture.

23. An article comprising the polyurethane adhesive of claim 22.

24. The article of claim 23, wherein the article further comprises a semipermeable membrane, wherein the polyurethane adhesive adheres to the semipermeable membrane.

25. The article of claim 24, wherein the article is a reverse osmosis module.

26. A method for preventing or reducing osmotic blistering of a semipermeable membrane otherwise subject thereto, the method comprising:
   forming the adhesive composition of claim 1;
   mixing the first part and second part of the adhesive composition to form a mixture;
   applying the mixture to a semipermeable membrane in an amount sufficient to secure the semipermeable membrane to a porous support;
   curing the mixture to form a polyurethane adhesive; and
   filtering a solvent through the semipermeable membrane by reverse osmosis;
   wherein the polyurethane adhesive prevents or reduces osmotic blistering of the semipermeable membrane.

* * * * *